(12) United States Patent
Murata et al.

(10) Patent No.: US 8,193,882 B2
(45) Date of Patent: Jun. 5, 2012

(54) STARTING DEVICE FOR ENGINES

(75) Inventors: Mitsuhiro Murata, Niwa-gun (JP); Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 12/461,327

(22) Filed: Aug. 7, 2009

(65) Prior Publication Data
US 2010/0033066 A1 Feb. 11, 2010

(30) Foreign Application Priority Data

Aug. 7, 2008 (JP) .................................. 2008-204222
Sep. 9, 2008 (JP) .................................. 2008-231128
Dec. 17, 2008 (JP) .................................. 2008-320617

(51) Int. Cl.
*H01H 51/00* (2006.01)
(52) U.S. Cl. ........ 335/126; 335/131; 335/177; 335/220; 74/7 A; 74/7 R
(58) Field of Classification Search ................ 310/68 R, 310/83; 335/126, 131, 132, 196, 5, 155, 335/220; 290/38 R, 48; 74/7 A, 7 R; 123/179.25
See application file for complete search history.

(56) References Cited

U.S. PATENT DOCUMENTS

| 719,572 | A | | 2/1903 | Evenden |
|---|---|---|---|---|
| 1,662,026 | A | | 3/1928 | Brophy |
| 1,852,957 | A | | 4/1932 | Dalton et al. |
| 5,245,881 | A | * | 9/1993 | Rometsch ........................ 74/7 A |
| 5,432,384 | A | | 7/1995 | Isozumi et al. |
| 5,677,656 | A | * | 10/1997 | Mauch et al. ................... 335/126 |
| 5,892,422 | A | * | 4/1999 | Montaigu et al. .............. 335/126 |
| 5,909,067 | A | * | 6/1999 | Liadakis .......................... 310/14 |
| 6,863,041 | B2 | * | 3/2005 | Nagai et al. .............. 123/179.25 |
| 6,923,152 | B2 | * | 8/2005 | Nagai et al. .............. 123/179.25 |
| 7,034,643 | B1 | * | 4/2006 | Kusumoto et al. ............ 335/126 |
| 7,038,564 | B1 | * | 5/2006 | Kusumoto et al. ............ 335/126 |
| 7,626,280 | B2 | * | 12/2009 | Kurasawa et al. ........... 290/38 R |
| 2004/0020315 | A1 | | 2/2004 | Vilou et al. |
| 2004/0080291 | A1 | | 4/2004 | Inoue et al. |
| 2004/0168666 | A1 | * | 9/2004 | Nagai et al. .............. 123/179.25 |
| 2007/0120632 | A1 | | 5/2007 | Tsukada et al. |
| 2007/0188278 | A1 | | 8/2007 | Tsukada et al. |

(Continued)

FOREIGN PATENT DOCUMENTS

EP 2 080 898 A2 7/2009
(Continued)

OTHER PUBLICATIONS

Partial European Search Report issued European Patent Application No. 09010250.0 on Dec. 8, 2009.

(Continued)

*Primary Examiner* — Tran Nguyen
(74) *Attorney, Agent, or Firm* — Oliff & Berridge, PLC

(57) ABSTRACT

An electromagnetic switch unit comprises a solenoid device that pushes out a pinion gear to a ring gear side of an engine, and an electromagnetic switch that opens and closes a main point of contact of a motor circuit. The solenoid device and the electromagnetic switch are arranged in series in an axial direction, while a magnetic plate that forms a part of magnetic circuit between a first coil used for the solenoid device and a second coil used for the electromagnetic switch is shared by the solenoid device and the electromagnetic switch.

14 Claims, 13 Drawing Sheets

U.S. PATENT DOCUMENTS

| | | |
|---|---|---|
| 2007/0194867 A1 | 8/2007 | Kurasawa et al. |
| 2009/0002105 A1* | 1/2009 | Bradfield et al. ............. 335/187 |
| 2010/0096941 A1 | 4/2010 | Inoue et al. |

FOREIGN PATENT DOCUMENTS

| | | |
|---|---|---|
| JP | Y2-56-42437 | 10/1981 |
| JP | U-57-40240 | 3/1982 |
| JP | U-61-7839 | 1/1986 |
| JP | U-61-8933 | 1/1986 |
| JP | U-61-169484 | 10/1986 |
| JP | A-4-347368 | 12/1992 |
| JP | A-6-2636 | 1/1994 |
| JP | A-2001-35336 | 2/2001 |
| JP | B2-3162242 | 4/2001 |
| JP | A-2001-351493 | 12/2001 |
| JP | A-2002-303236 | 10/2002 |
| JP | A-2003-83212 | 3/2003 |
| JP | A-2004-144019 | 5/2004 |
| JP | A-2006-161590 | 6/2006 |
| JP | A-2007-242585 | 9/2007 |
| WO | WO 2008/044347 A1 | 4/2008 |

OTHER PUBLICATIONS

European Search Report issued on Mar. 2, 2010 in corresponding European Patent Application No. 09 010 250.0.

Mar. 23, 2012 Office Action issued in U.S. Appl. No. 13/358,235.

* cited by examiner

STARTING DEVICE FOR ENGINES

CROSS-REFERENCE TO RELATED APPLICATION

This application is based on and claims the benefit of priority from earlier Japanese Patent Application No. 2008-204222 filed Aug. 7, 2008, No. 2008-231128 filed Sep. 9, 2008, and No. 2008-320617 filed Dec. 17, 2008, the contents of which are incorporated herein by reference.

BACKGROUND OF THE INVENTION

1. Technical Field of the Invention

The present invention relates to a starting device for engines having an electromagnetic switch that opens and closes a main point of contact of a motor circuit and a solenoid device that pushes a pinion gear to an engine side.

2. Description of the Related Art

As conventional technology, a starting device for engines disclosed in Japanese Utility Model Application Laid-Open Publication No. 56-42437, for example, is well known. The starting device for engines comprises an electromagnetic switch that opens and closes a main point of contact of a motor circuit, an electromagnetic means (an electromagnet device) that pushes out a pinion gear to the engine side via a lever, and a detector that detects an engagement state of the pinion gear and a ring gear.

When the pinion gear is engaged with the ring gear after pushed out by the electromagnetic means to the engine side, and the engagement state of the pinion gear and the ring gear is detected by the detector, the electromagnetic switch is turned on and the main point of contact is closed. Consequently, the torque of the motor is transmitted to the ring gear via the pinion gear, and starts the engine.

By the way, an installing space of a starter for an automobile is usually the place right next to the engine, and, in many cases, functional components such as an intake manifold with higher priorities for the engine performance are arranged around the starter.

For this reason, since the starter that has only a starting function receives restrictions of an outer diameter size greatly in many cases, it becomes important to increase installing ability by miniaturizing the starter in order to secure the market competition power of the product itself.

By the way, regarding an electromagnetic switch equipped in a starter for automobiles, an electromagnetic switch for starters disclosed in Japanese Patent Application Laid-Open Publication No. 2007-242585 is well known as a conventional technology. The electromagnetic switch has a fixed iron core that is magnetized by the energization to an electromagnetic coil and a movable iron core attracted by the magnetized fixed iron core.

The electromagnetic switch interlocks with a motion of the movable iron core, and opens and closes an electric point of contact (main point of contact of a motor circuit). The fixed iron core is constituted by dividing it to a base part that is arranged facing the movable iron core and a disk part that fits into a perimeter of the base part and holds the base part, and the disk part is constituted with a plurality of laminated steel sheets.

When the above-mentioned electromagnetic switch is operated, that is, energizing the electromagnetic coil magnetizes the fixed iron core, the movable iron core made of soft steel collides the base part made of soft steel so that a loud collision noise occurs.

At this time, since the disk part of the fixed iron core is constituted with a plurality of laminated steel sheets, propagation of vibration generated by the collision with the movable iron core and the base part is suppressed. By this, although the noise emitted to the exterior is reduced to some extent, since the collision noise itself is not reduced, the effect of reducing the operation noise of the electromagnetic switch is not so large.

On the other hand, although adoption of an idol stop system etc. is predicted to be increased from now on for the improvement in fuel consumption resulting from a global warming issue, since number of times of starting the engine will increase rapidly if the idol stop system is adopted, the improvement in durability of the starter is needed.

Moreover, if the number of the vehicles equipped with the idol stop system increases, the number of the case where many vehicles start the engines all at once on the public streets under traffic congestion will increase, therefore the noise generated at the time of starting the engines (generated noise) increases, and noise problem generated around streets is assumed.

Furthermore, in order to cope with the problem of global warming in recent years, also in the car using an internal-combustion engine, the motion that introduces the so-called idol stop system that improves fuel consumption is accelerating by stopping the engine for the purpose of reducing carbon dioxide ($CO_2$) at the time of a stop.

Specifically, regarding durability, improvement in life of brushes used for a starter motor, and durability of a pinion gear and a ring gear will become main items. Although long-life brushes for the motors have been developed that the material is paid attention to, since the pinion gear and the ring gear are on the premise to be engaged on condition of no lubrication, the improvement of the material and the improvement of the method of engagement itself are needed.

In improvement of the method of the engagement, it is effective to keep proper extrusion of the pinion gear and the energization timing to the motor, and regarding these points, the well-known technology disclosed in the above-mentioned Publication No. 56-42437 is effective.

However, the electromagnetic switch that opens and closes the main point of contact of the motor circuit and the electromagnetic means that pushes out the pinion gear to the engine side are provided separately in the technology disclosed in the above-mentioned Publication No. 56-42437.

At the same time, the both are arranged parallel in the circumferential direction of the motor. With this composition, since a size increases in two directions in a radical direction to a main axis of the motor, a big disadvantage on the sizes arise in respect of installing the starter to the engine.

That is, in the ordinary starter that has one electromagnetic switch for one motor, in order to avoid interference with other parts arranged around the engine, the electromagnetic switch is shifted at a proper angle in the circumferential direction to the main axis of the motor for the solution.

However, since the electromagnetic switch and the electromagnetic means are arranged parallel in the circumferential direction of the motor in the starter disclosed in the above-mentioned Publication No. 56-42437, avoiding interference with other parts in two directions in the radical direction to the main axis of the motor seems to have many difficulties.

On the other hand, regarding the noise problem, in order to spread an idol stop system, reduction of the generated noise in connection with starting the engines becomes a subject. Among these, noises generated at the time of starting in the starter are a gear engagement noise that is generated when the pinion gear engages to the ring gear provided on the engine side, and an operation noise of the electromagnetic switch.

Since the operation noise of the electromagnetic switch is the noise generated at the moment of turning on the electromagnetic switch, i.e., the collision noise generated when the movable iron core collides with the fixed iron core is the loudest. Therefore, to reduce the collision noise becomes important to reduce the generated noise at the time of starting the engine.

On the other hand, Japanese Utility Model Application Laid-Open Publication No. 49-27140 and Japanese Patent Application Laid-Open Publication No. 59-65665 are well known as conventional technology regarding the gear.

In the Publication No. 49-27140, there is proposed a laminated type gear that forms a lamination structure object by laminating a large number of metal plates having tooth part in their perimeter, producing an elastic action to the structure object by press modifying a bowl-like metal object from the both sides of this lamination structure object, and integrating this lamination structure object by pinching it from both sides with the elastic action.

In the Publication No. 59-65665, there is proposed a gear that laminates several thin plates having tooth portions formed in their perimeter, and welds each other by electron beam welding at a tooth bottom and at a tooth top of each thin plate.

By the way, among the gear noise generated between the pinion gear and the ring gear, there are gear end surface collision noises generated when the end surface of the pinion gear collides with the end surface of the ring gear, and the gear engagement noises generated when the pinion gear engages to the ring gear and rotates.

However, when the gears disclosed in the Publication No. 49-27140 and the Publication No. 59-65665 are used as the pinion gear, since the gears shown in both publications are the laminated objects, it is possible to reduce the gear engagement noise, but the effect of reducing the gear end surface collision noise is not expectable.

That is, the gear shown in the Publication No. 49-27140, like mentioned above, is press modifying the bowl-like metal object from the both sides of the lamination structure object to produce the elastic action, pinching the lamination structure object from both sides with the elastic action tightly, and the whole gear is fixed in the axial direction by rivets, etc.

For this reason, the adhesion nature of each laminated metal plates is very high, and even if the gear is the lamination structure object, the whole gear is considered to have rigidity equivalent to one rigid body (for example, a pinion gear manufactured by cutting from a steel material, forging in the colds, etc.).

In this structure, since each metal plate (especially tooth part) that constitute the pinion gear cannot be bent mutually at the time the pinion gear collides with the ring gear when the gear shown in the Publication No. 49-27140 is used as the pinion gear with, it is difficult to reduce gear end surface collision noise.

Moreover, since the tooth bottom and the tooth top of the tooth portion formed on each laminated thin plate are welded each other by electron beam in the gear shown in the Publication No. 59-65665, the tooth portion of each thin plate cannot bend mutually.

For this reason, even when the gear shown in the Publication No. 59-65665 is used as the pinion gear like the case of the Publication No. 49-27140, it is difficult to reduce the gear end surface collision noise generated when the pinion gear collides with the ring gear.

SUMMARY OF THE INVENTION

The present invention has been made in light of the problem explained above, and has as its object to provide a starting device for engines that can keep the restrictions regarding its size to the minimum, while the starting device has a composition that the operation of opening and closing the main point of contact of the motor circuit and the operation of pushing out the pinion gear to the engine side are carried out by using separate electromagnetic switch.

The other object of the present invention is to provide a starting device for engines that has an electromagnetic switch that can reduce a collision noise generated when a movable iron core collides with a fixed iron core.

The other object of the present invention is to provide a starting device for engines that can reduce the gear noise generated when the pinion gear collides and engages to the ring gear, and the starter that can improve the wear resistance of the pinion gear.

In the starting device for engines according to a first aspect, there is provided a starting device for engines comprises a motor that generates torque, a pinion gear that moves in an axial direction and engages to a ring gear of an engine, and transmits the torque of the motor to the ring gear, a solenoid device having a first coil that forms an electromagnet by energization, and pushes out the pinion gear to the ring gear side via a shift lever that is driven by an attraction power of the first coil, and an electromagnetic switch having a second coil that forms an electromagnet by energization, and opens and closes a main point of contact disposed on a motor circuit by an attraction power of the second coil.

The solenoid device and the electromagnetic switch are arranged integrally in series in an axial direction, while a magnetic plate that forms a part of a magnetic circuit between the first coil and the second coil is shared by the solenoid device and the electromagnetic switch.

According to the above-mentioned composition, since the solenoid device and the electromagnetic switch are arranged integrally in series in the axial direction, the projection area in the axial direction can be made smaller compared with the case where the both are arranged in parallel in the circumferential direction of the motor.

As a result, the solenoid device and the electromagnetic switch can be installed in the space nearly enough to the space where the operation of opening and closing the main point of contact and the operation of pushing out the pinion gear that are carried out by using one electromagnetic switch.

In addition, since the solenoid device and the electromagnetic switch share the magnetic plate, number of the parts can be reduced, and thus lowers the manufacturing cost.

In the starting device for engines according to a second aspect, wherein, the first coil and the second coil are wound so that the directions of a current flow in the first coil and in the second coil are the same.

In the starting device for engines according to a third aspect, the starting device further comprising a frame part that forms a part of the magnetic circuit in an anti-magnetic plate side of the first coil in an axial direction, and a second magnetic plate that forms a part of the magnetic circuit in an anti-magnetic plate side of the second coil in an axial direction, wherein, when a thickness of the frame part is T1, a thickness of the magnetic plate arranged between the first coil and the second coil is T2, and a thickness of the second magnetic plate is T3, the following formula (1) is satisfied.

$$T2 \leq T1 + T3 \qquad \text{(formula 1)}$$

In the starting device for engines according to a fourth aspect, the starting device for engines further comprises an electromagnetic switch comprises an electromagnetic coil that forms an electromagnet by energization, a fixed iron core that is magnetized by an energization to the electromagnetic coil arranged on one end side in an axial direction of the electromagnetic coil, and a movable iron core that moves in the axial direction in an inner circumference of the electromagnetic coil.

A laminated part formed by laminating a plurality of steel sheets in an axial direction is provided to one or both of the movable iron core and the fixed iron core in the part where the movable iron core is attracted by the magnetized fixed iron core and collide each other.

In the starting device for engines according to a fifth aspect, wherein, a boss part for supporting and fixing the laminated part is provided in either the movable iron core or the fixed iron core that constitutes the laminated part, each of a plurality of steel sheet is formed in a ring shape with a round hole opened in a central part thereof, the laminated part in the state where a plurality of steel sheet is laminated, the boss part is inserted into an inner circumference of the round hole, and an inner circumference side of a plurality of steel sheet is fixed to the boss part by press fitting or caulking, and a perimeter side of a plurality of steel sheet is laminated in the state where each steel sheets has dissociated.

In the starting device for engines according to a sixth aspect, wherein, the laminated part has a resin member having $1/10$ or less thickness of the steel sheet intervene between the steel sheets.

In the starting device for engines according to a seventh aspect, wherein, the fixed iron core comprises a base part arranged facing the movable iron core and a disc part having a ring shape that supports the base part by fitting to a perimeter of the base part, the base part is constituted with a plurality of laminated steel sheets.

In the starting device for engines according to an eighth aspect, wherein, the electromagnetic coil is equipped in a starting device for automobiles.

In the starting device for engines according to a ninth aspect, the starting device for engines further comprises a pinion gear constituted by laminating a plurality of steel sheet with which tooth portions of the pinion gear are formed in an outer diameter side, wherein, the steel sheet adjoin in a lamination direction are joined in an axial direction in the position where the steel sheets do not get caught with the tooth portions so that at least each tooth portion can be bent mutually.

In the starting device for engines according to a tenth aspect, wherein, the pinion gear has a central hole in a central part thereon in a radical direction that penetrates in an axial direction, a plurality of steel sheet has a hole in the central part thereon in the radical direction that forms the central hole, while a plurality of concave part dented towards an outside in the radial direction from an inner diameter the hole are formed, and a base of a plurality of the concave part is joined in the axial direction.

In the starting device for engines according to an eleventh aspect, wherein, a means for joining is a welding.

In the starting device for engines according to a twelfth aspect, wherein, oil is impregnated in a minute gap formed between each steel sheet that adjoins in the lamination direction.

In the starting device for engines according to a thirteenth aspect, wherein, each concave part formed in a plurality of steel sheet is filled up with oils and fats, such as grease.

In the starting device for engines according to a fourteenth aspect, wherein, an output shaft has a clutch on its perimeter that fit in helical-spline manner, the pinion gear is fit in a spline manner to a perimeter of an inner tube that is an inner of the clutch extended in an anti-motor direction and rotates integrally with the inner tube, while the pinion gear is supported movably in predetermined distance against the inner tube a pinion gear side end surface and a inner tube side end surface are formed between the pinion gear and the inner tube facing each other in the axial direction, while an elastic body is arranged between the pinion gear side end surface and the inner tube side end surface

DETAILED DESCRIPTION OF THE PREFERRED EMBODIMENTS

With reference to the accompanying drawings, hereinafter are described embodiments of the present invention.

[The First Embodiment, the First Example]

Figure 1:
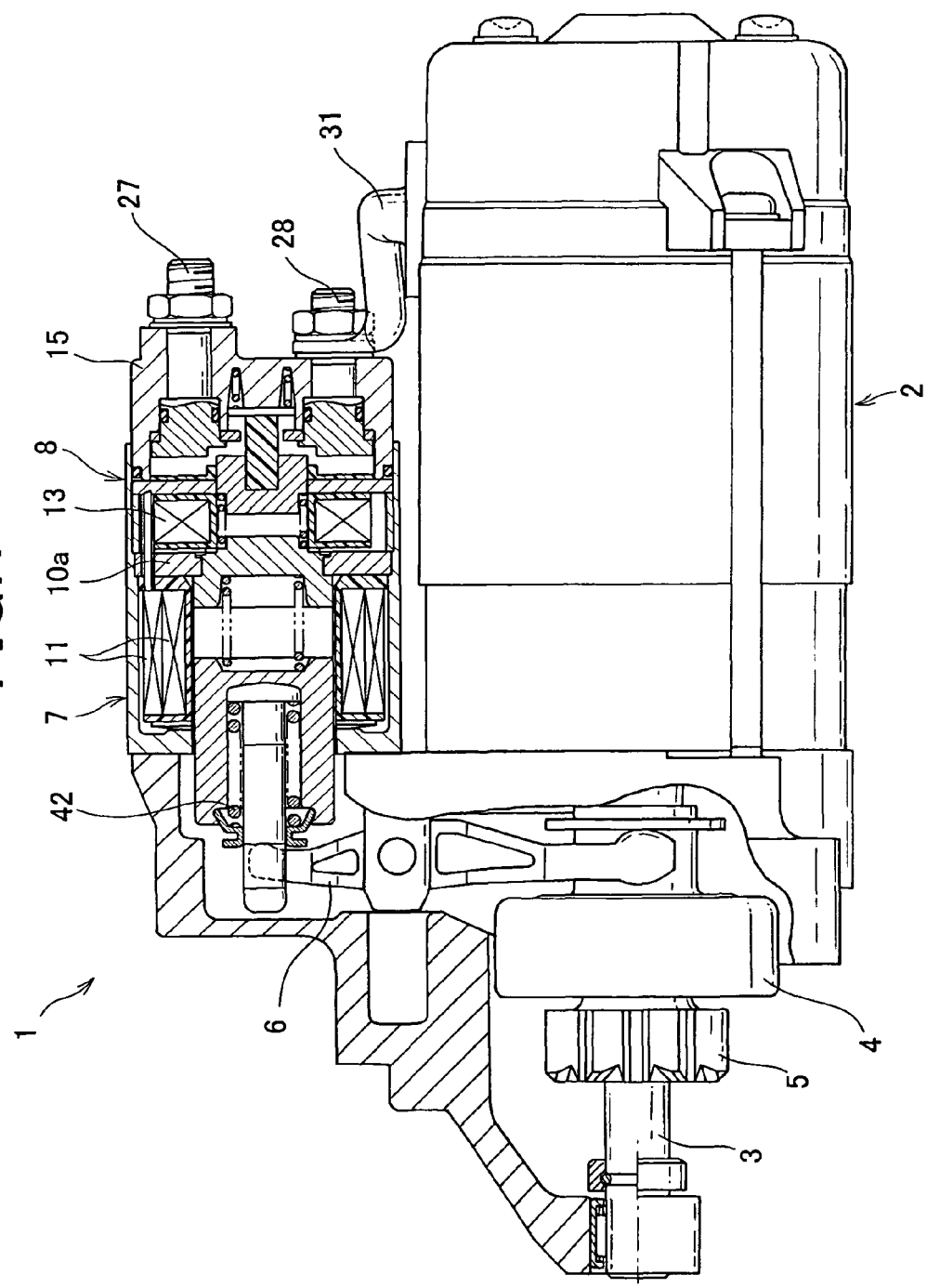
FIG. 1 shows a side view of an entire starter.
Figure 2:
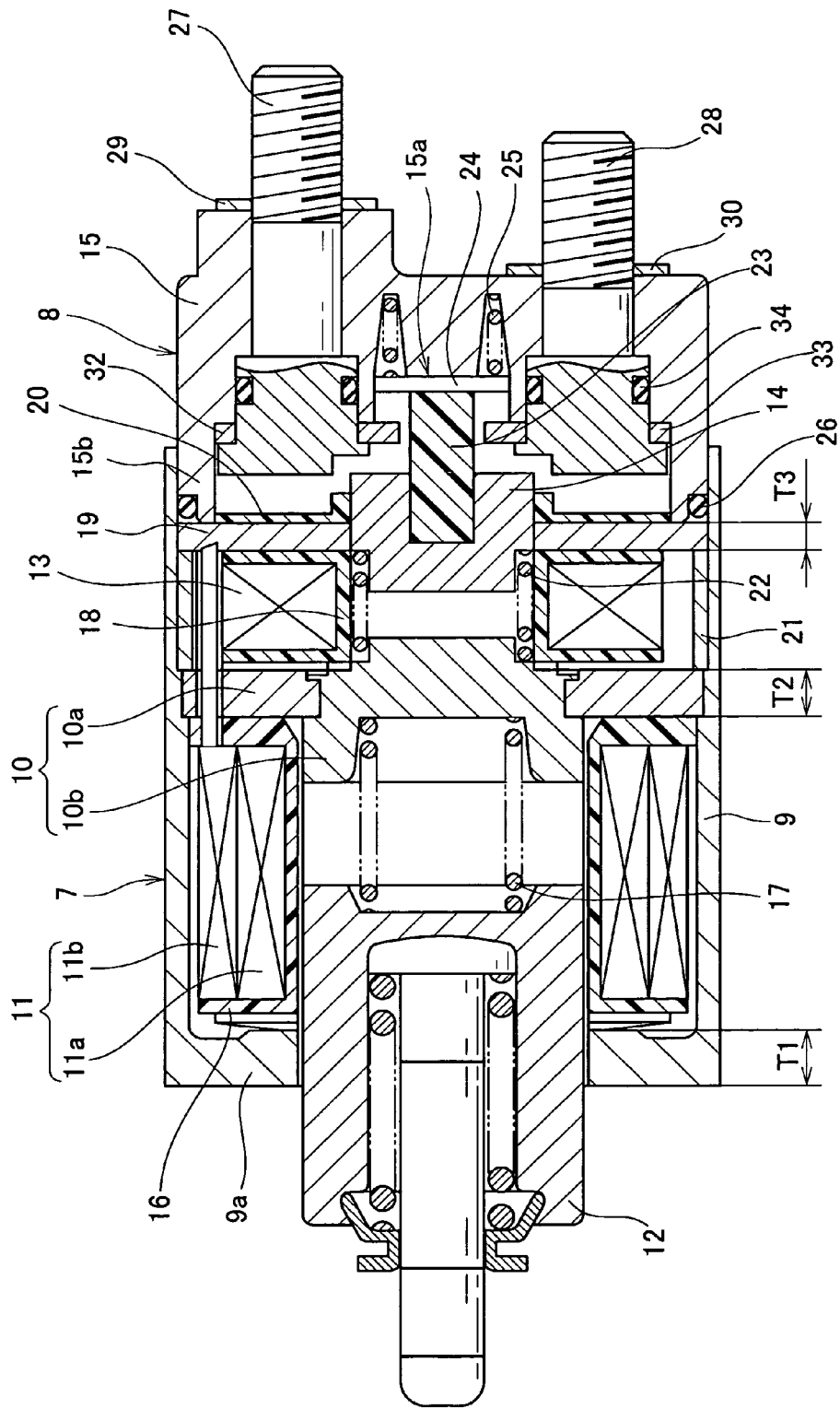
FIG. 2 shows a sectional view of an electromagnetic switch unit.
Figure 3:
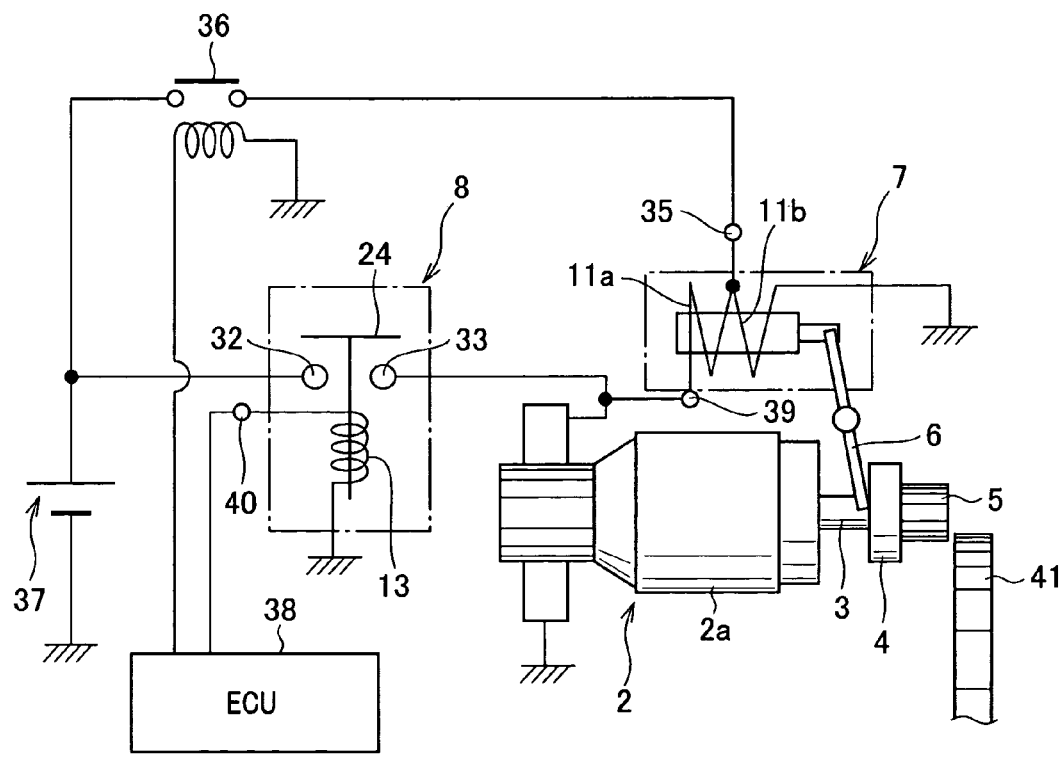
FIG. 3 shows an electric circuit of a starter.

FIG. 1 shows a side view of an entire view of the starter 1, FIG. 2 shows a sectional view of an electromagnetic switch unit, and FIG. 3 shows an electric circuit of a starter 1. The starter 1 of the first embodiment, the first example comprises a motor 2, an output shaft 3 driven and rotated by the motor 2, a pinion gear 5, a solenoid device 7, electromagnetic switch 8, and the like, as shows in FIG. 1.

The motor 2 generates torque to a rotor 2a (refer to FIG. 3). The pinion gear 5 is arranged with a clutch 4 integrally at a perimeter of the output shaft 3. The solenoid device 7 has a function of pushing out the clutch 4 and the pinion gear 5 to an anti-motor side (left side in the figure) via a shift lever 6.

The electromagnetic switch 8 opens and closes a main point of contact (mentioned later) provided in an energization circuit (called a motor circuit hereinafter) of the motor 2.

As shown in FIG. 2, the solenoid device 7 and the electromagnetic switch 8 of the present invention are constituted integrally as an electromagnetic switch unit. It should be appreciated that the right-hand side of the electromagnetic switch unit shown in FIG. 2 is called the motor side in an axial direction, and the left-hand side is called the pinion side in the axial direction hereafter.

The electromagnetic switch unit has a unit case 9 and a fixed iron core 10 that are shared by the solenoid device 7 and the electromagnetic switch 8. The unit case 9 serves as a yoke that forms a part of magnetic circuit, and is formed in a tubular (or cylindrical) shape with the pinion side end in the axial direction closed by an annular bottom wall portion 9*a* (equivalent to a frame part).

The fixed iron core 10 comprises a magnetic plate 10*a* formed in a circular shape and a core part 10*b* caulked and fixed to an inner circumference of the magnetic plate 10*a*.

An end portion of a perimeter of the magnetic plate 10*a* in the pinion side in the axial direction contacts a step portion formed in an inner circumference of the unit case 9 so that the position of the fixed iron core 10 is fixed in the pinion side in the axial direction.

A first coil 11 used for the solenoid device 7, a second coil 13 used for the electromagnetic switch 8 and a plunger 12, and a plunger 14 are accommodated inside the unit case 9. A point-of-contact cover 15 made of resin is attached to an opening side of the unit case 9.

The first coil 11 comprises two coils (an attraction coil 11*a* and a maintaining coil 11*b*), and is wound around a bobbin 16 made of resin in a two-layer state. The first coil 11 is arranged at the pinion side in the axial direction of the magnetic plate 10*a*.

The plunger 12 is inserted in an inner circumference side of the first coil 11 facing against an end surface of the core part 10*b* on the pinion side in the axial direction. The plunger 12 is pressed to the pinion side in the axial direction by a return spring 17 arranged between the core part 10*b* and the plunger 12.

The second coil 13 is wound around a bobbin 18 made of resin, and is arranged at the motor side in the axial direction of the magnetic plate 10*a*. The second coil 13 is positioned in the axial direction via a second magnetic plate 19 that is arranged adjoining the second coil 13 in the motor side in the axial direction.

The second magnetic plate 19 forms a part of magnetic circuit, and is fabricated integrally with a resin member 20 provided in the bobbin 18.

A spacer member 21 having a cylindrical shape that forms a part of magnetic circuit between the magnetic plate 10*a* and the second magnetic plate 19 is arranged at the perimeter of the second coil 13. The position of the second magnetic plate 19 is fixed in the pinion side in the axial direction via the spacer member 21.

The plunger 14 is inserted in an inner circumference side of the second coil 13 facing against an end surface of the core part 10*b* on the motor side in the axial direction. The plunger 14 is pressed to the motor side in the axial direction by a return spring 22 arranged between the core part 10*b* and the plunger 14.

A plunger rod 23 made of resin is attached to the plunger 14. A movable contact 24 is fixed to a tip of the plunger rod in the motor side in the axial direction.

The movable contact 24 is pressed against a point-of-contact receptacle 15*a* provided in the point-of-contact cover 15 when the second coil 13 is not energized, and pressed to the pinion side in the axial direction by a point-of-contact pressure spring 25. The point-of-contact cover 15 having a cylindrical leg portion 15*b* is formed in a cylindrical shape with one end closed.

The leg portion 15*b* is inserted into the inside of the unit case 9 in the state where an end surface of the leg portion 15*b* in the pinion side in the axial direction contacts an end surface of the second magnetic plate 19 in the motor side in the axial direction.

The perimeter part of the leg portion 15*b* is caulked and fixed to an end part of the unit case 9. A seal member 26, such as a O-ring, seals between the point-of-contact cover 15 and the unit case 9, and prevents infiltration of the water, etc. from the outside.

Two terminal bolts 27 and 28 are attached to the point-of-contact cover 15, and caulked and fixed by washers 29 and 30, respectively. The two terminal bolts 27 and 28 are a B terminal bolt 27 connected to the high potential side (battery side) of the motor circuit via a battery cable, and a M terminal bolt 28 connected to the low potential side (motor side) of the motor circuit via a motor lead 31 (refer to FIG. 1), respectively, and fixed contacts 32 and 33 are formed inside the point-of-contact cover 15.

A seal member 34, such as a O-ring, seals between the two terminal bolts 27 and 28 and the point-of-contact cover 15, and prevents infiltration of the water, etc. from the outside. The main point of contact is formed by the movable contact 24 and a set of fixed contacts 32 and 33.

The main point of contact will be in a closed state when the both fixed contacts 32 and 33 contact the movable contact 24, while the main point of contact will be in open state when the movable contact 24 separates from the set of fixed contacts 32 and 33.

Next, the connection structure of the first coil 11 and the second coil 13 is explained based on FIG. 3. As for the first coil 11, both one end of the attraction coil 11*a* and one end of the maintaining coil 11*b* are connected to the first terminal for external connection 35. The first terminal for external connection 35 is connected to a battery 37 via a starter relay 36.

When the starter relay 36 turns ON via external ECU 38 (electrical control unit regarding starting the engine), the current that flows from the battery 37 is energized via the starter relay 36.

Another end of the attraction coil 11*a* is connected to a second terminal for external connection 39. The second terminal for external connection 39 is electrically connected with the M terminal bolt 28 via a splicing fitting (not shown).

Another end of the maintaining coil 11*b* is electrically grounded by being fixed to a surface of the magnetic plate 10*a* by welding etc., for example. One end of the second coil 13 is connected to the ECU 38 via a third terminal for external connection 40, and is energized at predetermined timing via the ECU 38.

Another end of the second coil 13 is electrically grounded by being fixed to a surface of the second magnetic plate 19 by welding etc., for example. Tip parts of three terminals for external connection 35, 39, and 40 are provided outside the point-of-contact cover 15.

Next, an operation of the electromagnetic switch unit is explained. First, the first coil 11 is energized from the battery 37 by turning on the starter relay 36 through the ECU 38.

By this, the plunger 12 is attracted by the core part 10*b* and moves to the motor side in the axial direction, thus the pinion gear 5 and the clutch 4 are pushed out via the shift lever 6 integrally in the anti-motor side.

After the pinion gear 5 contacts the ring gear 41 of the engine (refer to FIG. 3), the second coil 13 is energized through the ECU 38.

By this, the plunger 14 is attracted by the core part 10b and moves to the pinion side in the axial direction, thus the movable contact 24 contacts with the set of fixed contacts 32 and 33, and the main point of contact closes.

Consequently, the battery 37 energizes the motor 2 and the torque occurs in the rotor 2a, then the torque of the rotor 2a is transmitted to the output shaft 3. When the pinion gear 5 rotates, in response to the rotation of the output shaft 3, to the position where the ring gear 41 can be engaged, the pinion gear 5 engages with the ring gear 41 in response to the antipower of the drive spring 42 shown in FIG. 1, then the torque of the rotor 2a is transmitted to the ring gear 41 from the pinion gear 5 and cranks the engine.

[Effect of the First Embodiment, the First Example]

The electromagnetic switch unit of the present embodiment enables the engagement of the pinion gear 5 and the ring gear 41 always in the optimum state by controlling the energization timing to the second coil 13 by ECU 38 after energizing the first coil 11.

In addition, since the solenoid device 7 and the electromagnetic switch 8 are arranged in series in the axial direction, the projection area in the axial direction can be made smaller compared with the case where the both are arranged in parallel in the circumferential direction of the motor 2.

Further, since the solenoid device 7 and electromagnetic switch 8 shares the fixed iron core 10 integrally, the size in the axial direction can be shortened compared with the case where the fixed iron core 10 is formed separately.

Consequently, the solenoid device 7 and the electromagnetic switch 8 can be installed in the space nearly enough to the space where the operation of opening and closing the main point of contact and the operation of pushing out the pinion gear 5 that are carried out by using one electromagnetic switch.

[The First Embodiment, the Second Example]

In the electromagnetic switch unit disclosed in the first example, the second example is characterized that when a thickness of the bottom wall portion 9a of the unit case 9 is T1, a thickness of the magnetic plate 10a is T2, and a thickness of the second magnetic plate 19 is T3, as shown in FIG. 2, the following formula (1) is satisfied.

$$T2 \leq T1 + T3 \quad \text{(formula 1)}$$

For example, at the time of designing the magnetic circuit of the solenoid device 7, the thickness of the magnetic plate 10a must be secured when a quantity of magnetic flux increases most, i.e., when the plunger 12 is attracted to the core part 10b so that the magnetic plate 10a may not carry out magnetic saturation.

In other words, it is a usual state to form the magnetic plate 10a thin enough not to carry out magnetic saturation. By the way, if the first coil 11 and the second coil 13 are wound so that the direction of the magnetic flux generated by energization to the first coil 11 that passes along the magnetic plate 10a and the direction of the magnetic flux generated by energization to the second coil 13 that passes along the magnetic plate 10a turn into the same direction, the magnetic plate 10a would be already in the state near magnetic saturation at the time when the plunger 12 is stuck to the core part 10b by energization to the first coil 11

For this reason, the plunger 14 of the electromagnetic switch 8 is hardly attracted to the core part 10b when the second coil 13 is energized after energizing to the first coil 11. That is, the attraction power will decline as compared with the case that the electromagnetic switch 8 is used alone (in the case when the second coil 13 is energized without energizing the first coil 11).

Figure 4:
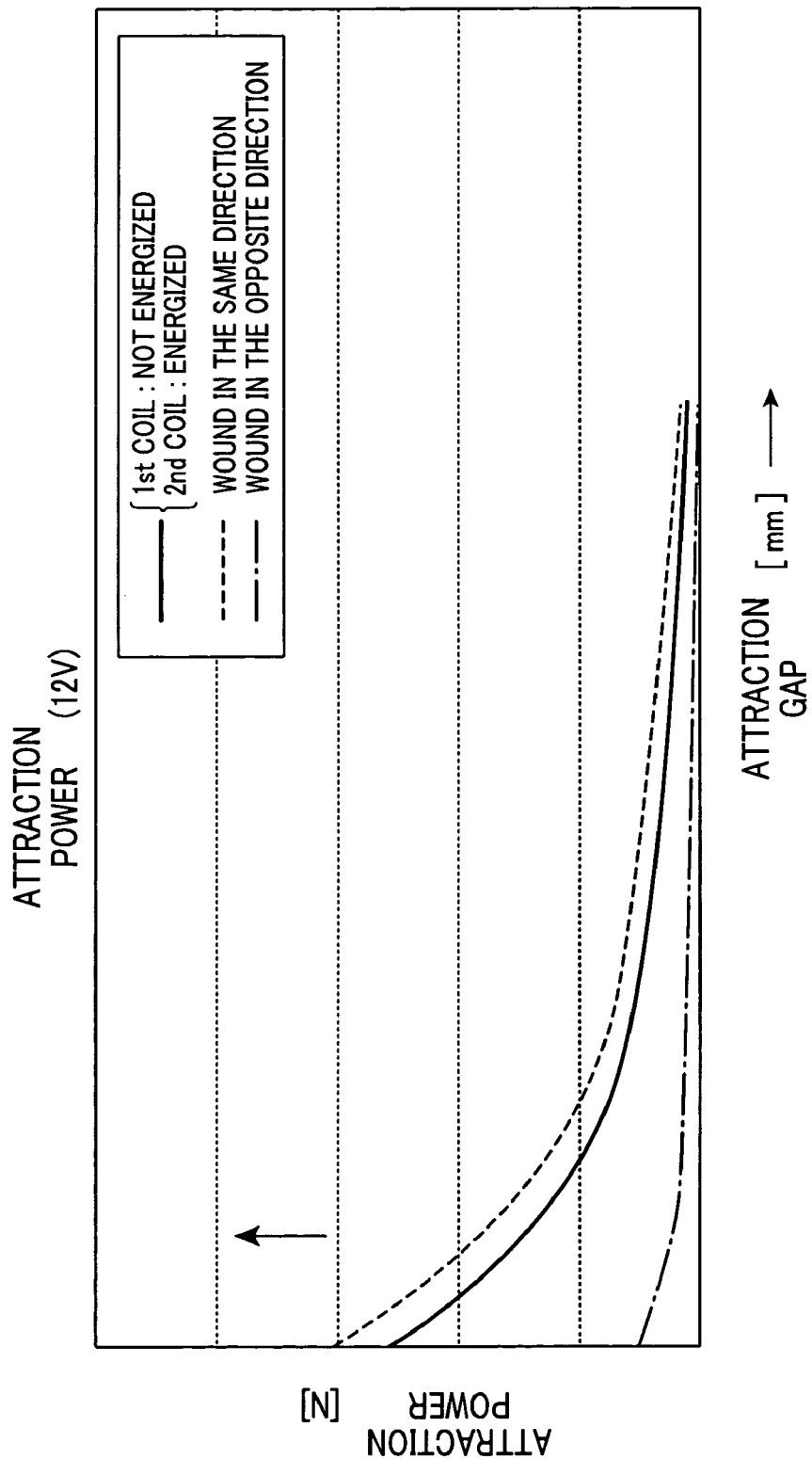
FIG. 4 shows a graph that shows an attraction power characteristic of the electromagnetic switch.

Actually, when the attraction power of electromagnetic switch 8 is measured, as shown in FIG. 4, the attraction power declines greatly when the first coil 11 and the second coil 13 are wound so that the directions of the magnetic fluxes become the same as compared with the case where the electromagnetic switch 8 is used alone.

In FIG. 4, the attraction power characteristic at the time of winding the first coil 11 and second coil 13 so that directions of magnetic fluxes become the same is indicated by an alternate long and short dash line, and the attraction power characteristic at the time of using the electromagnetic switch 8 alone is indicated by a solid line.

Now, in the present example, the first coil 11 and the second coil 13 are wound so that the directions of the current flow in the first coil 11 and in the second coil 13 are the same. In other words, the first coil 11 and the second coil 13 are wound so that the magnetic fluxes that pass along the magnetic plate 10a negate each other.

When the attraction power of the electromagnetic switch 8 is measured at the time of energizing the second coil 13 after energizing the first coil 11 in the above-mentioned composition, the result in which the attraction power goes up from the case where the electromagnetic switch 8 is used alone was obtained, as shown in FIG. 4 with a dashed line.

Thus, since the magnetic saturation of the magnetic plate 10a is suppressed by the windings of the first coil 11 and the second coil 13 so that directions of the current that flow in the first coil 11 and the second coil 13 become the same, the above-mentioned formula (1) is satisfied.

Consequently, the magnetic plate 10a can be thinner, thus the miniaturization of the electromagnetic switch unit is attained.

[The Second Embodiment, the First Example]

Figure 5:
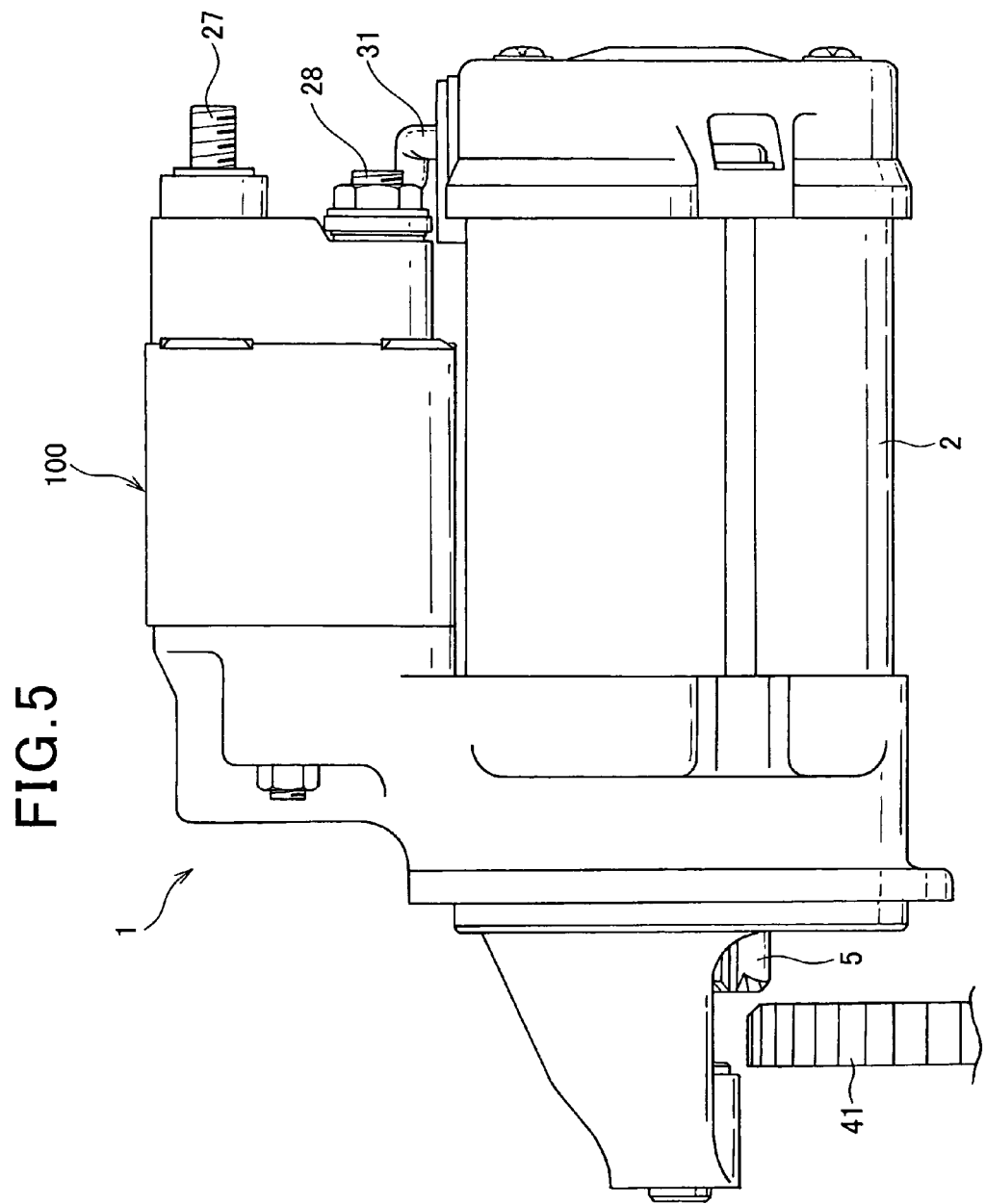
FIG. 5 shows a side view of a starter.
Figure 6:
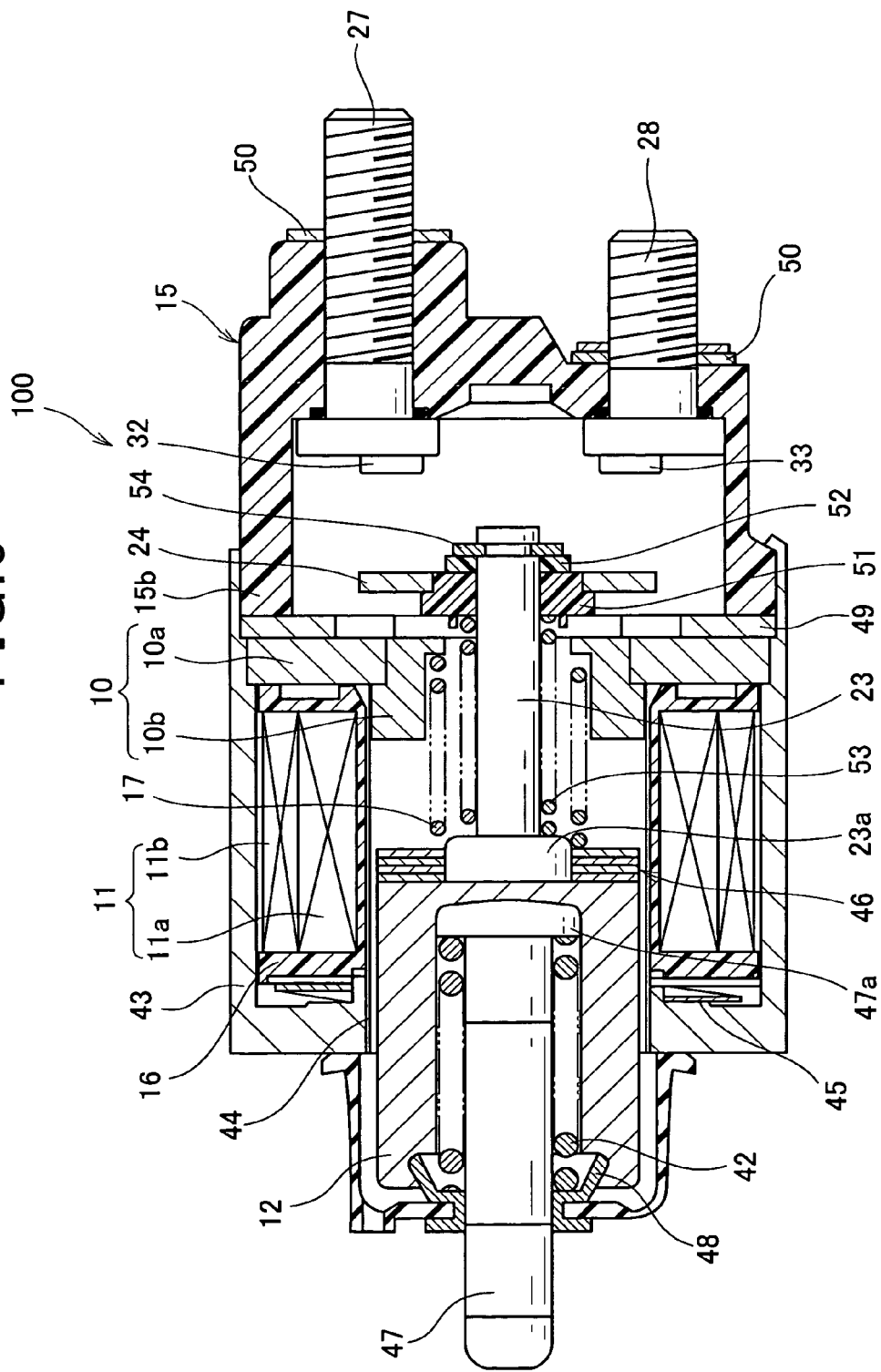
FIG. 6 shows a sectional view of an electromagnetic switch according to a second embodiment, a first example.

FIG. 5 shows a side view of a starter, and FIG. 6 is a sectional view of an electromagnetic switch 100. As shown in FIG. 5, the electromagnetic switch 100 of the second embodiment, the first example is equipped in a starter 1 for starting the engine.

The electromagnetic switch 100 pushes out a pinion gear 5 to a ring gear 411 of an engine side via a shift lever 6, and intermits an energization current to a motor 2.

As shown in FIG. 6, the electromagnetic switch 100 comprises two terminal bolts 27 and 28 connected to an energization circuit of a motor 2, a point-of-contact cover 15 made of resin to which the two terminal bolts 27 and 28 are fixed, a set of fixed contacts 32 and 33 disposed integrally with the two terminal bolts 27 and 28, a movable contact 24 that electrically intermits between the set of the fixed contacts 32 and 33, a main switch (explained below) that drives the movable contact 24, and the like.

The main switch comprises a switch case 43 that forms a frame and serves as a magnetic circuit, an electromagnetic coil 11 that is accommodated inside the switch case 43, a fixed iron core 10 that is magnetized by the energization to the electromagnetic coil 11, a movable iron core 12 that is inserted in an inner circumference of the electromagnetic coil 11 via a sleeve 44, a return spring 17 that is arranged between the fixed iron core 10 and the movable iron core 12, a plunger rod 23 that supports the movable contact 24, and the like.

An end side in an axial direction (right-hand side in the figure) of the switch case 43 is opened, and a circular shaped bottom surface is provided in the other end in the axial direction to form the switch case 43 in a cylindrical shape. The electromagnetic coil 11 comprises an attraction coil 11a and a maintaining coil 11b wound around a bobbin 16 made of resin in a two-layer state, and forms an electromagnet by energization.

The fixed iron core 10 is constituted by dividing it in a base part 10b arranged at an inner circumference of one end side of a sleeve 44 and a disk part 10a having a ring shape that adjoins on one end side of a bobbin 16 in an axial direction, and formed integrally by press fitting a perimeter of the base part 10b into an inner circumference of the disk part 10a.

An outer diameter part of the fixed iron core 10 in the coil side in a plate thickness direction contacts a step portion formed in an inner circumference of the switch case 43 so that the position of the fixed iron core 10 is fixed in the axial direction.

An elastic member 45 that presses the electromagnetic coil 11 to the disk part 10a side is arranged between an inner bottom side of the switch case 43 and an end surface of the other end of the bobbin 16 in the axial direction, so that the movement of the electromagnetic coil 11 in the axial direction is suppressed by an elasticity of the elastic member 45.

The movable iron core 12 has a bottom surface in one end side (right-hand side in the figure) in an axial direction and the other end is opened to form a tubular (or cylindrical) shape with a bottom portion. The movable iron core 12 is arranged in the inner circumference of a sleeve 44 slidably in the axial direction facing the base part 10b of the fixed iron core 10.

A laminated part 46 (mentioned later) is disposed at an end portion of the one end side in the movable iron core 12 that faces the base part 10b. A joint member 47 that transmits a motion of the movable iron core 12 to the shift lever 6 and a drive spring 42 that gives a thrust for pushing the pinion gear 5 to the ring gear 41 after the pinion gear 5 contacts the ring gear 41 at the time of starting the engine to the pinion gear 5 are built into the movable iron core 12.

An end side in the axial direction of the joint member 47 is inserted into an inside of a cylinder formed in the movable iron core 12, and a flange part 47 formed in one end of the joint member 47 is forced on the bottom the cylinder in response to the reaction force of the drive spring 42 accommodated inside of the cylinder.

The drive spring 42 is arranged elasticity between the flange part 47a of the joint member 47 and a stopping washer 48 that is caulked and fixed to the cylinder opening of the movable iron core 12. When the energization to the electromagnetic coil 11 intercepted, the movable iron core 12 is pushed back to the anti-base part direction (to the left in the figure) by the return spring 17.

A plunger rod 23 is arranged in the axial direction passing through a central opening of the base part 10b, and a large diameter part 23a provided in one end is fixed to an end surface of the movable iron core 12 by welding etc.

The point-of-contact cover 15 is formed in the shape having a bottom with a cylindrical leg part 15b. The tip side of the leg part 15b fits into the inner circumference of one end side opening of the switch case 43, and is attached via rubber packing 49 to the disk part 10a of the fixed iron core 10.

A part in a circumferential direction or all the circumferences of the of leg part 15b is caulked and fixed to the opening end of the switch case 43. The two terminal bolts 27 and 28 are a B terminal bolt 27 connected to the battery 37 via a battery cable, and a M terminal bolt 28 connected to the plus pole brush inside a motor (not shown) via the motor lead 31 (refer to FIG. 5).

The two terminal bolts 27 and 28 are bolted and fixed via caulking washers 50 to the bottom of the point-of-contact cover 15.

Both bolt heads of the B terminal bolt 27 and M terminal bolt 28 are arranged inside the point-of-contact cover 15, and the fixed contacts 32 and 33 are formed on the bolt heads and integrally, respectively.

The movable contact 24 is supported slidably via insulating members 51 and 52 by the other end of the plunger rod 23 that passes through the central opening of the base part 10b and projects inside the point-of-contact cover 15.

In addition, the movable contact 24 is forced in the direction of a tip of the plunger rod 23 (to the right in FIG. 6) by a point-of-contact pressure spring 53 arranged at the perimeter of the plunger rod 23. Further, the movable contact 24 is prevented from slipping out from the plunger rod 23 with a washer 54 fixed to the tip part of the plunger rod 23, stops.

Next, the laminated part 46 regarding the present invention is explained. The laminated part 46 is arranged on the end surface of the movable iron core 12, where a plurality of ring-shaped steel sheet with round holes in the central part are laminated, and is fixed by press fitting an outer diameter of the large diameter part 23a of the plunger rod 23 to an inner diameter of the round hole of each steel sheets.

The adjacent steel sheets of the laminated part 46 are not joined by adhesion etc., by the way, but laminated after every sheet has dissociated, and only the inner diameter side of each steel sheet is press fit to the large diameter part 23a of the plunger rod 23.

The outer diameter of each steel sheet of the laminated part 46 is formed slightly smaller or the same size as the outer diameter of the movable iron core 12 so that the perimeter of the laminated part 46 does not slidly touch to the inner circumference of the sleeve 44 when the movable iron core 12 moves in the axial direction.

Next, the operation of the electromagnetic switch 100 is explained. When turning a starting switch (not shown) on energizes the electromagnetic coil 11, an electromagnet will be formed and the fixed iron core 10 is magnetized so that the attraction power works between the base part 10b of the fixed iron core 10 and the movable iron core 12.

Consequently, the movable iron core 12 moves to the base part 10b side (to the right in FIG. 6) while pushing and contracting the return spring 17, then stops when the laminated part 46 constituted on the end surface of the movable iron core 12 collides with the end surface of the base part 10b.

By the movement of the movable iron core 12, the pinion gear 5 is pushed out to the ring gear 41 side via the shift lever 6 connected with the joint member 47, and after the movable contact 24 supported by the end of the plunger rod 23 contacts the set of the fixed contacts 32 and 33, the load of the point-of-contact pressure spring 53 is given to the movable contact 24.

Thereby, a movable contact 24 is forced on the set of the fixed contacts 32 and 33 in response to the load of the point-of-contact pressure spring 53, and when the set of the fixed contacts 32 and 33 are connected via the movable contact 24, electric power is supplied from the battery 37 to the motor 2.

When the energization to the electromagnetic coil 11 stops and the attraction power of the electromagnet disappears by turning the starting switch off after the engine has started, the movable iron core 12 will be pushed back in the direction of the anti-base part by the reaction force of the return spring 17 so that the movable contact 12 separates from the set of the fixed contacts 32 and 33, thus between the set of the fixed contacts 32 and 33 is intercepted electrically and the electric supply to the motor 2 from the battery is stopped.

[Effect of the Second Embodiment, the First Example]

In the electromagnetic switch 100 of the second embodiment, the first example, when the movable iron core 12 is attracted by the base part 10*b* of the fixed iron core 10 by energization to the electromagnetic coil 11, the movable iron core 12 and base part 10*b* collide via the laminated part 46 provided on the end surface of the movable iron core 12, thus the shock at the time of the collision is eased by the laminated part 46.

Consequently, the collision noise generated at the time of the collision can be reduced.

Since the inner diameter side of a plurality of steel sheets is fixed by press fitting to the large diameter part 23*a* of the plunger rod 23, the laminated part 46 provided in the movable iron core 12 does not fall out from the large diameter part 23*a* of the plunger rod 23 even when the movable iron core 12 collides with the base part 10*b* repeatedly, thus the durability can be secured.

Since the perimeter side of each steel sheet is dissociated and is not fixed mutually, the friction effect between each steel sheet by the relative position gap can be acquired, and its shock relieving effect does not decrease.

Further, when the starter 1 equipped with the electromagnetic switch 100 of the present example is applied to idol stop vehicles (vehicles employing an idol stop system), the operation sound of the starter 1 can be reduced so that the noise problem around the street that vehicles run can be suppressed, and street environment can be improved.

[The Second Embodiment, the Second Example]

Figure 7:
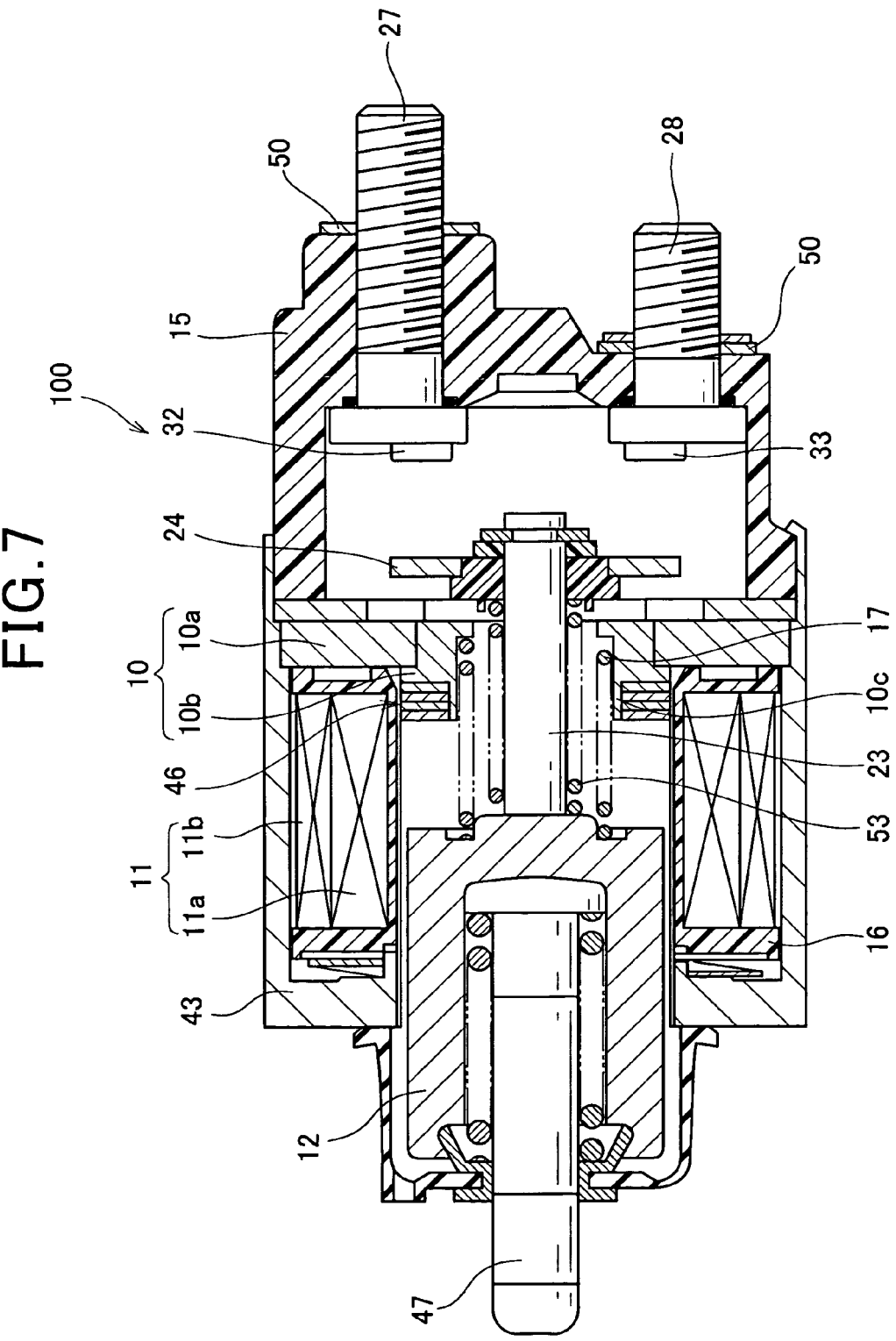
FIG. 7 shows a sectional view of the electromagnetic switch according to the second embodiment, a second example.

FIG. 7 is a sectional view of the electromagnetic switch 100 according to the second embodiment, the second example. As shown in FIG. 7, fundamental composition of the electromagnetic switch 100 of the second embodiment, second example is the same as that of the second embodiment, the first example, and the point that differs from the first embodiment is to constitute the laminated part 46 in the base part 10*b* of the fixed iron core 10.

It should be appreciated that the same reference numbers are given to the same elements as the first embodiment, and explanation of these identical parts is omitted. Like the second embodiment, first example, the laminated part 46 is constituted by laminating a plurality of ring-like steel sheets, and fixed by press fitting an outer diameter of a cylindrical boss part 10*c* provided in the base part 10*b* to an inner diameter of a round hole of each steel sheet.

The same effect as the second embodiment, the first example, can be acquired in the second example. That is, since the shock at the time the movable iron core 12 collides with base part 10*b* can be eased by the laminated part 46, the collision noise generated at the time of the collision can be reduced.

[The Second Embodiment, the Third Example]

Figure 8:
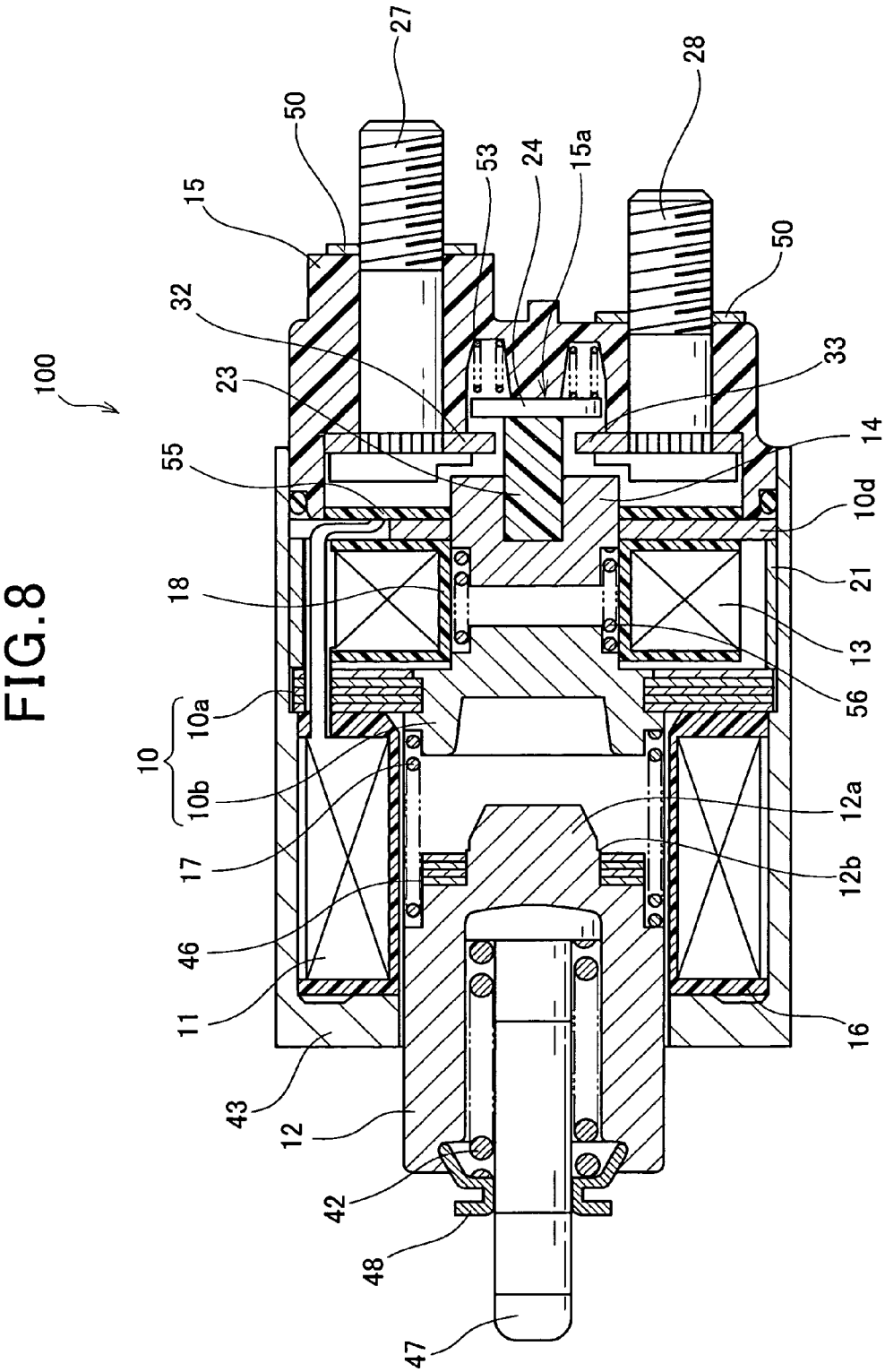
FIG. 8 shows a sectional view of the electromagnetic switch according to the second embodiment, a third example.

FIG. 8 is a sectional view of the electromagnetic switch 100 according to the second embodiment, the third example. The electromagnetic switch 100 of the second embodiment, the third example is constituted to use a separate electromagnetic coil and a movable iron core for the movement of pushing out the pinion gear 5 to the ring gear 41 side of the engine via the shift lever 6, and the movement of intermitting the energization current to the motor 2.

Specifically, the electromagnetic switch 100 comprises the electromagnetic coil 11 and the movable iron core 12 for pushing out the pinion gear 5 to the ring gear 41 side of the engine, a second electromagnetic coil 13 and a second movable iron core 14 for intermitting the energization current to the motor 2, and the fixed iron core 10 shared by both movements.

It should be appreciated that the same reference numbers are given to the same elements as the first example, and explanation of these identical parts is omitted. Further, the right-hand side of the electromagnetic switch 100 shown in FIG. 7 is called the motor side in an axial direction, and the left-hand side is called the pinion side in the axial direction hereafter.

The fixed iron core 10 comprises the base part 10*b* and the disk part 10*a* like the first example. However, the disk part 10*a* of the present example has a structure constituted by laminating a plurality of steel sheets, which is different from the first and the second examples.

The electromagnetic coil 11 and the second electromagnetic coil 13 are wound around bobbins 16 and 34 made of resin, respectively, and are accommodated in the inside of the switch case 43 on both sides of the disk part 10*a* of the fixed iron core 10. That is, the electromagnetic coil 11 is arranged in the pinion side in the axial direction against the disk part 10*a*, and the second electromagnetic coil 13 is arranged in the motor side in the axial direction against the disk part 10*a*.

The second electromagnetic coil 13 is positioned in the axial direction via the magnetic plate 10*d* that is arranged adjoining a bobbin in the motor side in the axial direction. The magnetic plate 10*d* forms a part of magnetic circuit, and is fabricated integrally with a resin member 55 provided in the bobbin 18.

A spacer member 21 having a cylindrical shape that forms a part of magnetic circuit between the magnetic plate 10*a* of the fixed iron core 10 and the magnetic plate 10*d* is arranged at the perimeter of the second coil 13. The position of the magnetic plate 10*d* is fixed in the pinion side in the axial direction via the spacer member 21.

The movable iron core 12 is inserted slidably to the inner circumference of the electromagnetic coil 11 facing the end surface of the base part 10*b* in the pinion side in the axial direction, and is forced in the pinion side in the axial direction by the return spring 17 arranged between base part 10*b* and the movable iron core 12.

The laminated part 46 constituted by laminating a plurality of ring-like steel sheets, like the first example, is formed in the movable iron core 12. This laminated part 46 is fixed to the movable iron core 12 by a caulking portion 12*b* after inserting the outer diameter of convex part 12*a* provided in the bottom central part of the movable iron core 12 into the inner diameter of the round hole of each steel sheet.

The second movable iron core 14 is inserted slidably to the inner circumference of the second electromagnetic coil 13 facing the end surface of the base part 10*b* in the motor side in the axial direction, and is forced in the motor side in the axial direction by the return spring 56 arranged between base part 10*b* and the second movable iron core 14.

The plunger rod 23 made of resin is attached to the second movable iron core 14. The movable contact 24 is fixed at the tip of the plunger rod 23 in the motor side in the axial direction.

When the second electromagnetic coil 13 is not energized, the movable contact 24 is pressed against a point-of-contact receptacle surface 15*a* provided in the point-of-contact cover 15, and the load of the point-of-contact pressure spring 53 that forces the movable contact 24 in the motor side in the axial direction is given to the movable contact 24.

One of the fixed contacts 32 disposed in the B terminal bolt 27 and the other one of the fixed contacts 33 disposed in the M terminal bolt 28 are arranged inside the point-of-contact cover 15. As well as the first example, the B terminal bolt 27 and the M terminal bolt 28 are bolted and fixed via caulking washers 50 to the bottom of the point-of-contact cover 15.

Now, the operation of the electromagnetic switch 100 is substantially the same as that of the first example, and explanation is omitted.

[Effect of the Second Embodiment, the Third Example]

Since the electromagnetic switch 100 of the second embodiment, the third example has formed the laminated part 46 on the end surface of the movable iron core 12 that faces the base part 10*b* in the axial direction as well as the first embodiment, when the movable iron core 12 is attracted by the base part 10*b* of the fixed iron core 10, the movable iron core 12 and the base part 10*b* collide via the laminated part 46.

Thereby, since the shock at the time of the collision is eased by the laminated part 46, the collision noise generated at the time of the collision can be reduced. In addition, since the disk part 10*a* that supports the base part 10*b* is constituted with a plurality of laminated steel sheets, propagation of vibration generated by the collision with the movable iron core 12 and the base part 10*b* is suppressed, thus the noise emitted to the exterior is reduced. Consequently, as compared with the first example, the generated noise of the electromagnetic switch 100 can be reduced further.

[Modification]

The laminated part 46 disclosed in the first to the third examples of the second embodiment may have a resin member (not shown) intervene between the steel sheets. The resin member has ⅟10 or less thickness of the steel sheet and the influence on magnetic attraction power is small.

Since the relieving effect of the shock increases by having the resin member intervene between the steel sheets compared with the case where only a plurality of the steel sheets are laminated, the generated collision noise can be reduced further.

In addition, attraction ability equivalent to the case where the resin member is not used is securable by setting the thickness of the resin member thin. Although the first to the third examples of the second embodiment disclosed examples that form the laminated part 46 in one of the movable iron core 12 and the base part 10*b*, the laminated part 46 can also be formed in both the movable iron core 12 and the base part 10*b*. In this case, when the movable iron core 12 is attracted by the base part 10*b*, it is possible to reduce generated collision noise further since the laminated part 46 collides each other.

[The Third Embodiment, the First Example]

Figure 9:
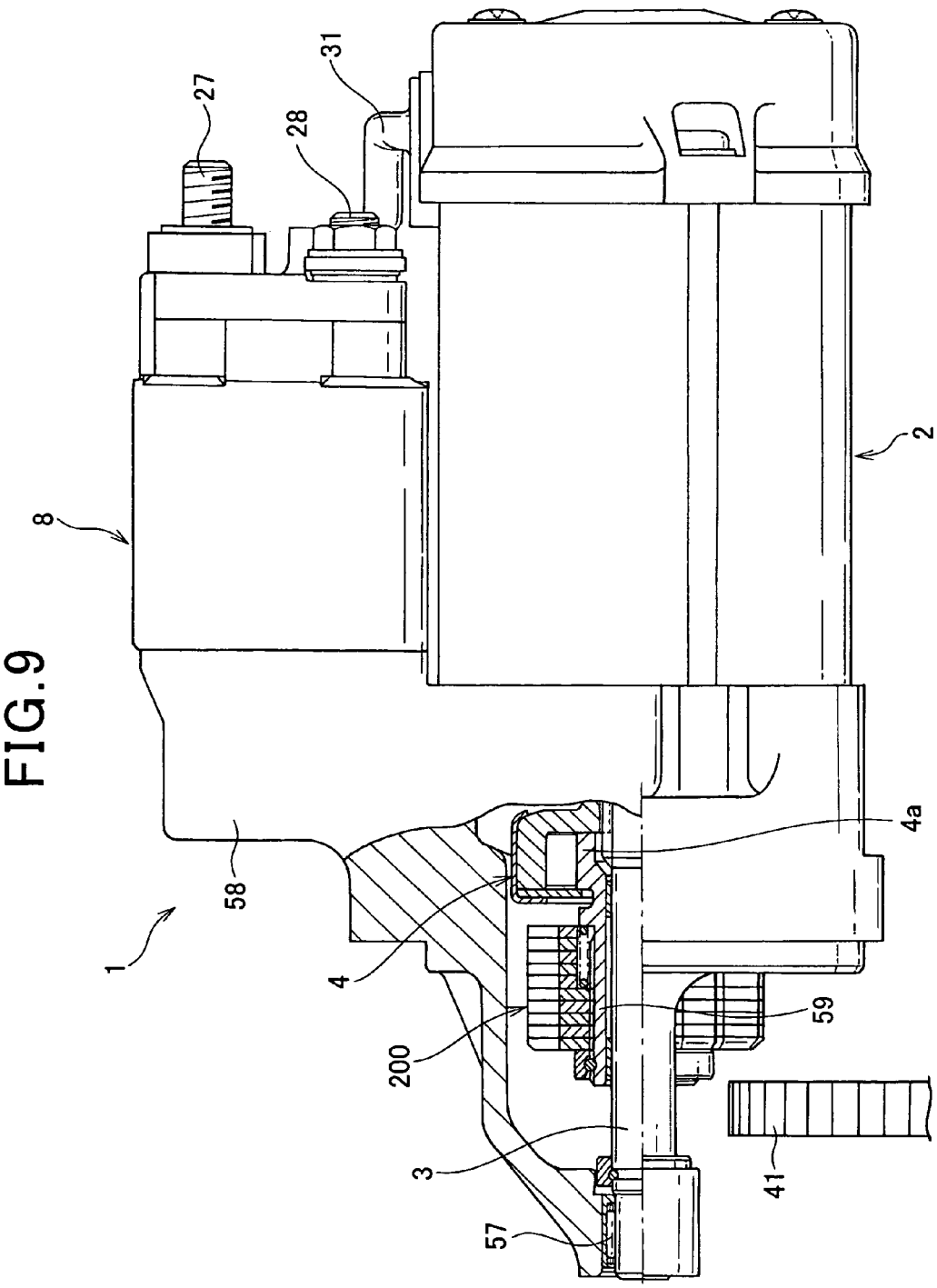
FIG. 9 shows a side view of a starter.
Figure 10:
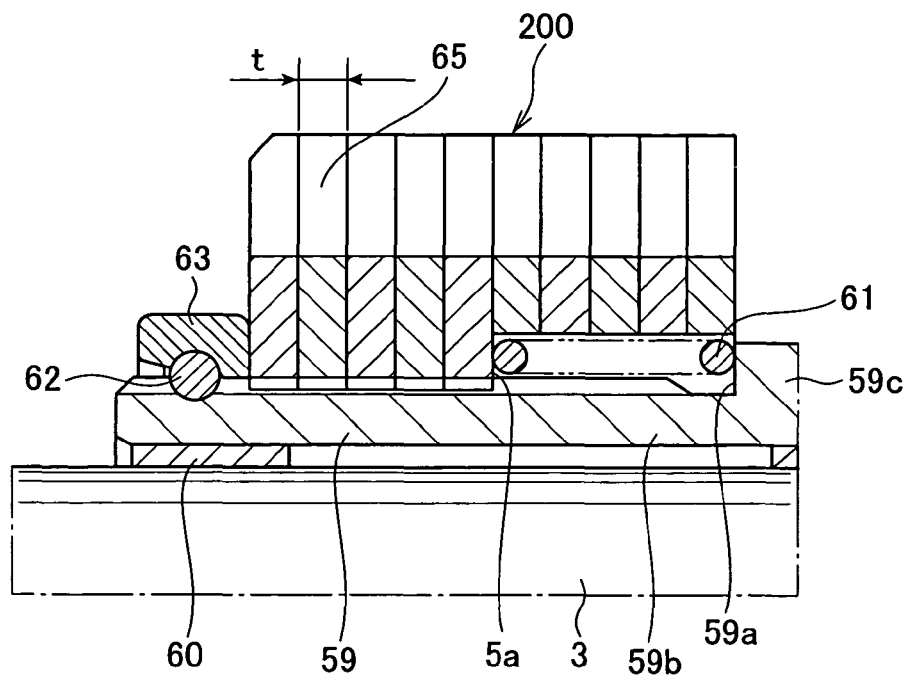
FIG. 10 shows a sectional view showing an arrangement and a composition of a pinion gear according to a third embodiment, a first example.

FIG. 9 is a side view of a starter 1 regarding the third embodiment, the first example of the present invention, and FIG. 10 is a sectional view showing an arrangement and a composition of a pinion gear 200.

As shown in FIG. 9, the starter 1 of the third embodiment comprises a motor 2 that generates torque, an output shaft 3 that is driven by the motor 2 and rotates, the pinion gear 200 arranged integrally with a clutch 4 on an perimeter of the output shaft 3, an electromagnetic switch 8 that pushes out the clutch 4 and the pinion gear 200 in the direction of an anti-motor (to the left in the figure) via a gearshift 6 and opens and closes a main point of contact (not shown) provided in a motor circuit, and the like. After engaging the pinion gear 200 pushed out by the electromagnetic switch 8 in the direction of an anti-motor to the engine ring gear 41, the torque of the motor 2 is transmitted to the ring gear 41 from the pinion gear 200, and starts engine.

The motor 2 is a well-known DC (direct current) motor that generates torque on a rotor shaft (not shown) in response to supply of electric power from the mounted battery 37 when the main point of contact is closed by the electromagnetic switch 8. A housing 58 supports one end in the anti-motor side (left-hand side in the figure) of the output shaft 3 rotatably via a bearing 57, and end part of the other end is connected with the rotor shaft.

It should be appreciated that a speed reduction device (for example, planetary gear reduction system) may be provided between the rotor shaft and the output shaft 3 so that the rotation speed of the rotor shaft is slowed down by the speed reduction device, and is transmitted to the output shaft 3. The clutch 4 is fit in helical-spline manner on the perimeter of the output shaft 3, and intermits the transfer of power between the output shaft 3 and the pinion gear 200.

That is, when the output shaft 3 is driven by the motor 2 and rotates at the time of starting the engine, rotation of the output shaft 3 is transmitted to the pinion gear 200.

On the other hand, when the engine drives the pinion gear 200 by starting the engine (i.e., the revolving speed of the pinion gear 200 exceeds the revolving speed of the output shaft 3), the power transfer on the output shaft 3 from the pinion gear 200 is intercepted so that the rotation of the pinion gear 200 is not transferred to the output shaft 3.

The pinion gear 200 is fit in a direct-spline manner to a perimeter of an inner tube 59 that is an inner 4*a* (refer to FIG. 9) of the clutch 4 extended in an anti-motor direction and rotates integrally with the inner tube 95, while the pinion gear 200 is supported movably in predetermined distance against the inner tube 59.

It should be appreciated that the inner tube 59 is fitted into a perimeter of the output shaft 3 rotatably via a bearing 60 (refer to FIG. 10). The pinion gear 200, as shown in FIG. 10, is forced in a direction of a tip of the inner tube 59 (to the left in the figure) with a spring 61 (or elastic bodies, such as rubber, are sufficient) to the inner tube 59, and the moving range to the direction of the anti-motor is regulated by a pinion stopper 63 arranged in the tip part of the inner tube 59 via a snap ring 62. The snap ring 62 is fitted and fixed to a groove cut in the perimeter surface of the inner tube 59.

The spring 61 is arranged in the state where predetermined anti-power (initial load) is conserved between a gear side end surface 5*a* formed in an inner diameter side of the pinion gear 200 and a tube side end surface 59*a* formed in the outer diameter side of the inner tube 59.

The gear side end surface 5*a* that receives one end of the spring 61 is formed by a surface in the axial direction formed in a space part provided in the inner diameter side of the pinion gear 200 in the motor side in the axial direction (right-hand side in the figure).

The tube side end surface 59*a* that receives the other end of the spring 61 is formed by a spline formation part 59*b* where the pinion gear 200 is engaged in the direct-spline manner and a step formed between the spline formation part 59*b* and a large diameter portion 59*c* whose outer diameter is set larger than that of the spline formation part 59*b*, and the tube side end surface 59*a* faces in the axial direction to the gear side end surface 5*a*.

The outer diameter of the large diameter portion 59*c* of the inner tube 59 is set a little smaller than the inner diameter of the space part of the pinion gear 200 so that the pinion gear 200 can move in the axial direction against the inner tube 59.

It should be appreciated that since the structure and its function of the electromagnetic switch 8, and the operation of the pinion gear 200 by the electromagnetic switch 8 are fundamentally the same as what were disclosed in the embodiments and examples mentioned above, explanation here is omitted.

Next, features of the pinion gear 200 regarding the present invention are explained.

As shown in FIG. 10, the pinion gear 200 of the third embodiment is constituted with a plurality of laminated thin steel sheets 65 (for example, ten sheets) each of which has a thickness of t=2 mm, for example.

Figure 12B:
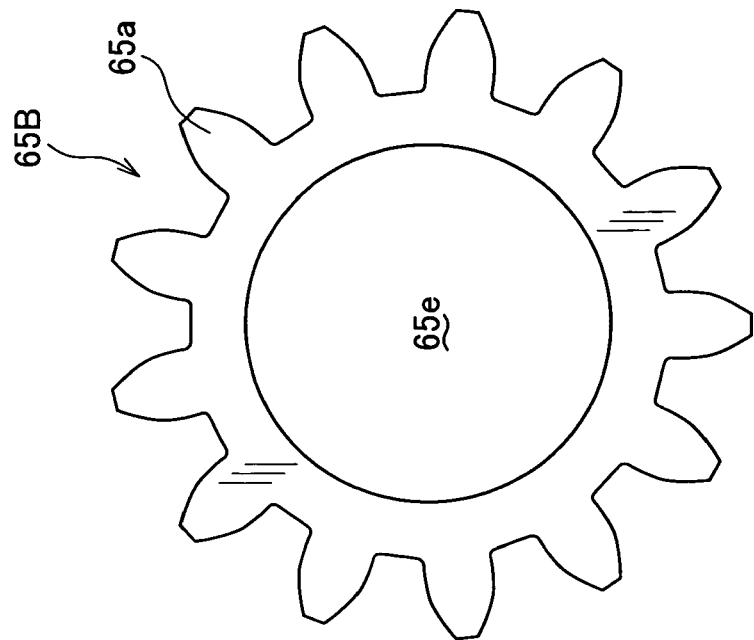
FIG. 12B shows a 1 plane view of a second sheet.
Figure 12A:
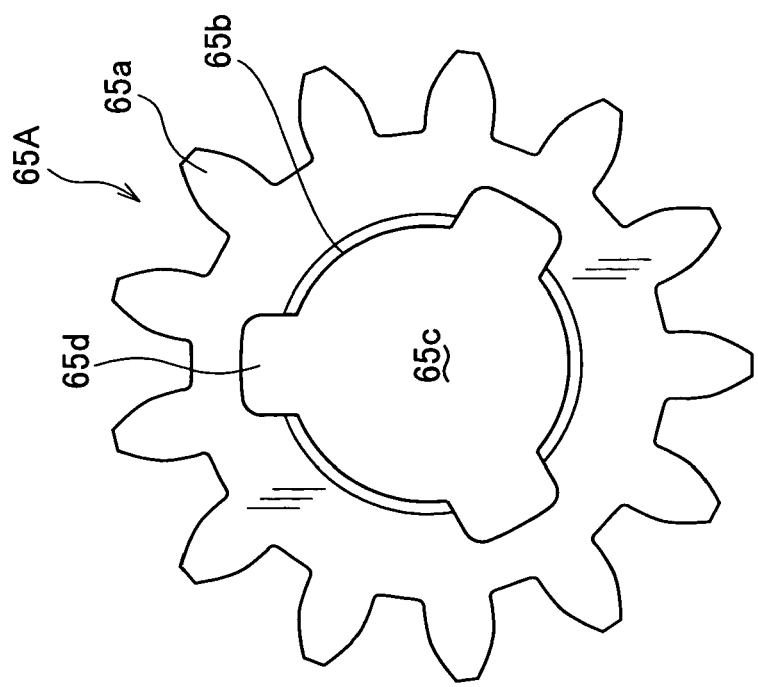
FIG. 12A shows a plane view of a first sheet.

As shown in FIGS. 12A and 12B, each of the steel sheets 65 has a plurality of tooth portions 65a of the pinion gear 200 on the outer diameter side thereof. The plural tooth portions 65a are formed so as to be arranged with a constant pitch.

Five sheets, for example, of the steel sheets 65 (hereinafter, referred to as "first sheets 65A") have fitting holes 65c having spline teeth 65b on the inner diameter side thereof. A plurality of concave parts 65d are formed around the circumference of the fitting hole 65c. The concave parts 65d are formed on the outer diameter side with respect to the inner circumference of the fitting hole 65c.

As shown in FIG. 12B, remaining five steel sheets 65 (hereinafter, referred to as "second sheets 65B") have circular fitting holes 65e on the inner diameter side thereof. The fitting holes 65e have no spline teeth.

The central hole of the pinion gear 200 is formed of the fitting holes 65c formed in the first sheets 65A and the fitting holes 65e formed in the second sheets 65B.

The fitting holes 65e formed in the second sheets 65B have inner diameters larger than those of the fitting holes 65c formed in the first sheets 65A. The distance between the center of the fitting hole 65c formed in the first sheets 65A and the base of the concave portion 65d is equal to the radius of the fitting hole 65e formed in the second sheets 65B.

The plurality of laminated steel sheets 65 are integrated in such a manner that the steel sheets 65, which are adjacent to each other in the lamination direction, are joined by a joint means in the axial direction (lamination direction).

Figure 11:
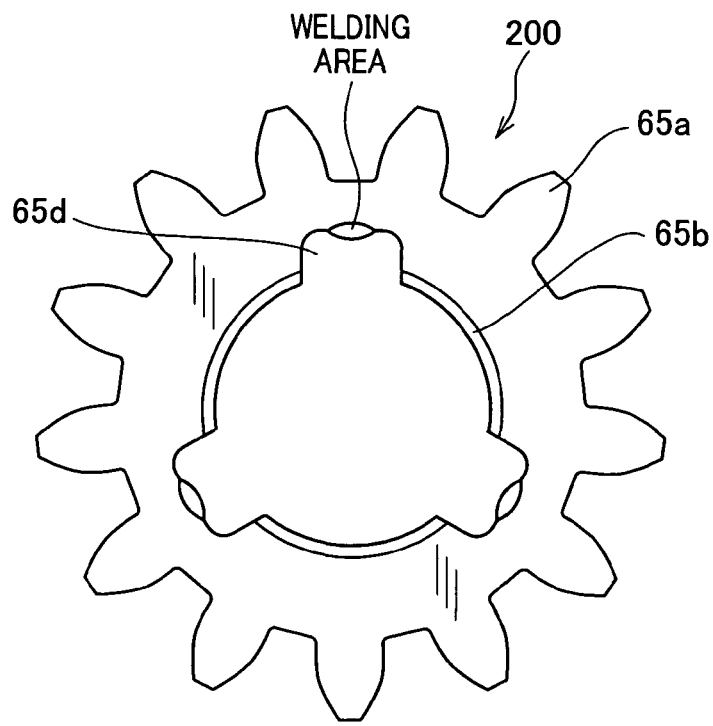
FIG. 11 shows a plane view of the pinion gear showing a junction part of each steel sheet according to the third embodiment, the first example.

For example, as shown in FIG. 11, the bases of the concave portions 65d formed in the first sheet 65A are joined with the inner circumference of the fitting hole 65e (which is located at a position corresponding to the bases of the concave portions 65d formed in the first sheet 65A) formed in the second sheet 65B by welding etc.

After the steel sheets 65 are integrated by welding etc, the steel sheets 65 are subject to a heat treatment such as carburizing and quenching. Hence, the thickness t of each steel sheet 65 can be increased or decreased in consideration of the degree of the heat treatment.

Corner parts of the pinion gear 200 may be chamfered in order to improve engagement with the ring gear 41. In the third embodiment, after the steel sheets 65 are laminated and integrated by welding etc, the pinion gear 200 may be chamfered by machining. Thereafter, the pinion gear 200 may be subject to a heat treatment.

The space part in which the spring 61 is arranged is formed of the fitting holes 65e formed in the five second sheets 65B, shown in FIG. 10, located right-hand side. Gear side end surfaces 5a are plate surfaces extending in the circumferential direction (portions exposed on the inner circumference side of the fitting hole 65e formed in the second sheet 65B) positioned between the concave portions 65d formed in the fifth (when counting from the most left first sheet 65A) first sheet 65A shown in FIG. 10.

Although the pinion gear 200 of the first example laminates a plurality of the steel sheet 65 and joins them by welding etc., a welding area is set to a position that is not applied to the tooth portion 65a of the pinion gear 200, i.e., the inner diameter side of the tooth portion 65a of the pinion gear 200, and tooth portion 65a is not joined.

For this reason, when the end surface of the pinion gear 200 collides with the end surface of the ring gear 41, the tooth portion 65a of each steel sheet 65 that constitutes the pinion gear 200 can be bent in very small amount so that friction between the tooth portions 65a adjoining each other in the direction of lamination is produced.

Consequently, since the impact force produced by the collision with the pinion gear 200 and the ring gear 41 is eased by the action of friction resulting from relative displacement of the tooth portion 65a of each steel sheet 65, the collision noise (gear end surface collision noise) generated when the pinion gear 200 collides with the ring gear 41 can be reduced.

In addition, since the spring 61 is arranged between the gear side end surface 5a of the pinion gear 200 facing in the axial direction and the tube side end surface 59a of the inner tube 59 in the starter 1 of the first example, the impact force produced by the collision with the pinion gear 200 and the ring gear 41 is reduced by the action of friction resulting from relative displacement between each steel sheet 65 that constitutes the pinion gear 200. Further, the impact force is absorbed when the spring 61 bends between the gear side end surface 5a and the tube side end surface 59a.

Consequently, since the impact force transmitted to the output shaft 3 can be suppressed, the collision noise generated by the collision with the pinion gear 200 and the ring gear 41 propagating to the output shaft 3 side is decreased, thus the noise generating at the time of starting engine can be lowered.

Although the spring 61 is used as an example of the elastic body in the present example, the use of the elastic bodies, such as rubber that has an attenuation action of a shock instead of a spring 61 can reduce the generating noise further.

Moreover, when the pinion gear 200 is engaged to the ring gear 41 and rotates, and the torque change resulting from the engine load acts on the pinion gear 200, the shock in the circumferential direction generated by the change of the engine side is reduced by the friction action between each steel sheet 65 that constitutes the pinion gear 200, thus the gear engagement noise can be reduced.

In order to check the reduction effect of the gear noise (the gear end surface collision noise and the gear engagement noise) generated when the pinion gear 200 collides and engages to the ring gear 41, a measurement examination of a noise pressure level was performed by the inventor of the present invention.

The measurement examination was performed in the case where a conventional pinion gear (a pinion gear formed by cutting from a piece of the steel material or forging in the colds) is used and the case where the pinion gear 200 of the third embodiment, the first example constituted by laminating a plurality of steel sheet 65 is used.

Figure 13:
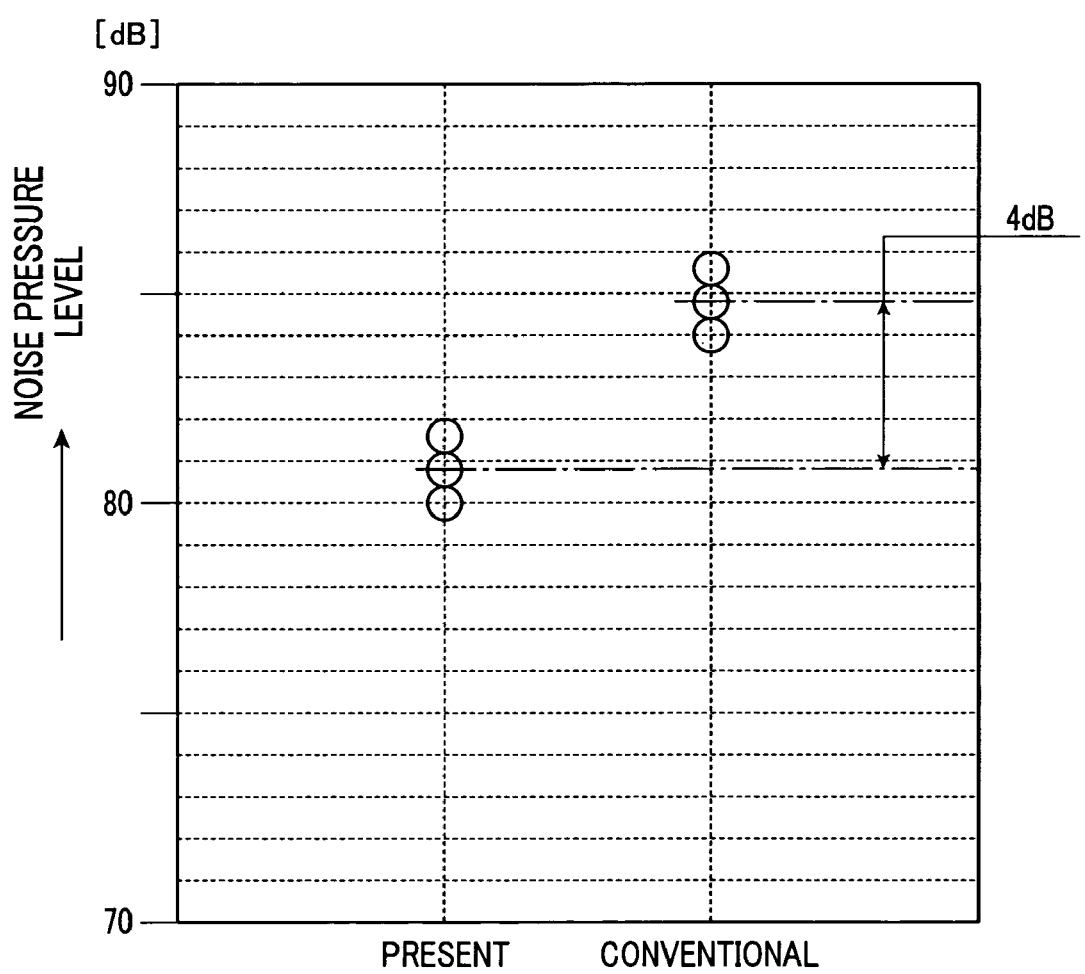
FIG. 13 is a figure showing an examination result of measuring a noise pressure level of a generated noise at the time of starting.

According to the result from the above-mentioned examination, as shown in FIG. 13, compared with the conventional pinion gear ("CONVENTIONAL" in the figure), the pinion gear 200 ("PRESENT" in the figure) of the first example was able to acquire the reduction effect with the noise pressure level of 4 dB from the starter 1 in the distance 15 cm away.

In addition, it was checked that the reverberant noise that originates in the collision of the metal also in noise quality decreases, and a jarring feeling is lost. From the above result, since using the pinion gear 200 of this invention for a starter 1 can reduce the generating noise at the time of starting the engine with a starter 1, improvement in the noise environment in connection with starting the engine on streets can be aimed at.

Especially, more the vehicles introduce the idol stop system, the effect (improvement in the noise environment) becomes larger.

Further, in the present example, the following effects can be acquired by joining each steel sheet 65 that are laminated by welding. Although the pinion gear 200 usually requires a heat treatment such as carburizing and quenching etc., for the purpose of reducing the wear and of strength, each steel sheet 65 is joined by welding, i.e., joined by melting a part of the steel sheet 65, the combination of different-species material does not arise.

For this reason, since each steel sheet 65 can be joined firmly, without making a special change from the conventional heat treatment conditions, the quality of the pinion gear 200 is securable. Moreover, since joining means other than welding, such as a soldering joining, for example, requires an equipment of a soldering furnace, the conventional manufacturing process will be necessary to be rearranged.

On the other hand, if junction means is welding, the conventional manufacturing process can be used as it is without changing, thus cost increase in the process side is avoidable.

[The Third Embodiment, the Second Example]

Figure 14:
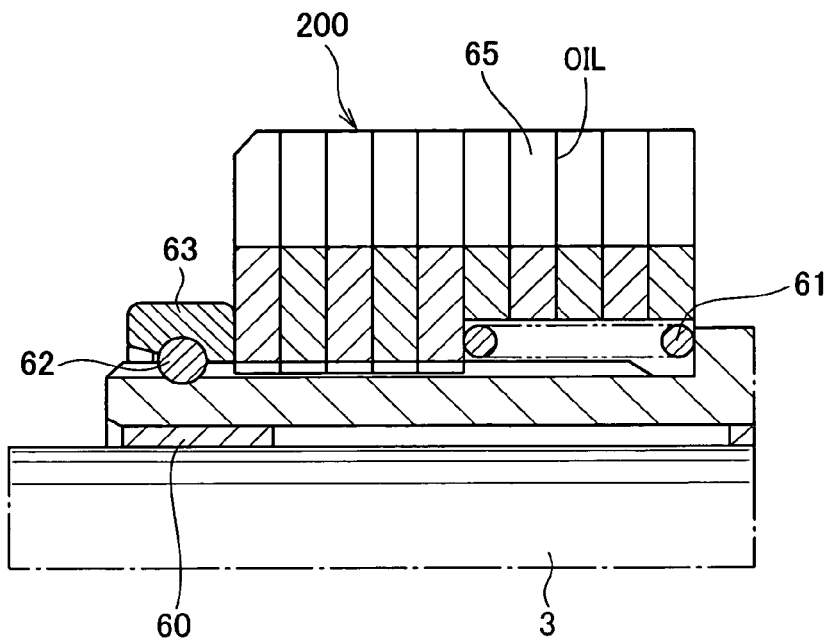
FIG. 14 shows a sectional view showing an arrangement and a composition of a pinion gear according to the third embodiment 2, a second example.

FIG. 14 is a sectional view showing the arrangement and the constitution of the pinion gear 200 according to the third embodiment, the second example of the present invention.

The pinion gear 200 of the second example is integrated in such a manner that the steel sheets 65 are laminated and joined in the axial direction by welding etc, which is the same manner as in the first example of the third embodiment. In addition, as shown in FIG. 14, oil is impregnated in a minute gap between the steels 65 which are adjacent to each other in the lamination direction.

When the pinion gear 200 rotates in a state where the pinion gear 200 engages with the ring gear 41, the oil impregnated in the gap between the steels 65 moves to the outer circumference side by the centrifugal force. Most of the oil which has reached the outer circumference seeps little by little to the outer diameter side. Since the seeping oil acts as lubricating oil between teeth which engage with the ring gear 41, wear resistance of the pinion gear 200 and the ring gear 41 can be improved. Since each gap between the steels is minute, the oil seeps from the tooth surfaces little by little. This can maintain the wear resistance for a long time. Hence, the pinion gear 200 can be preferably applied to vehicles in which an idle stop system is introduced.

[The Third Embodiment, the Third Example]

Figure 15:
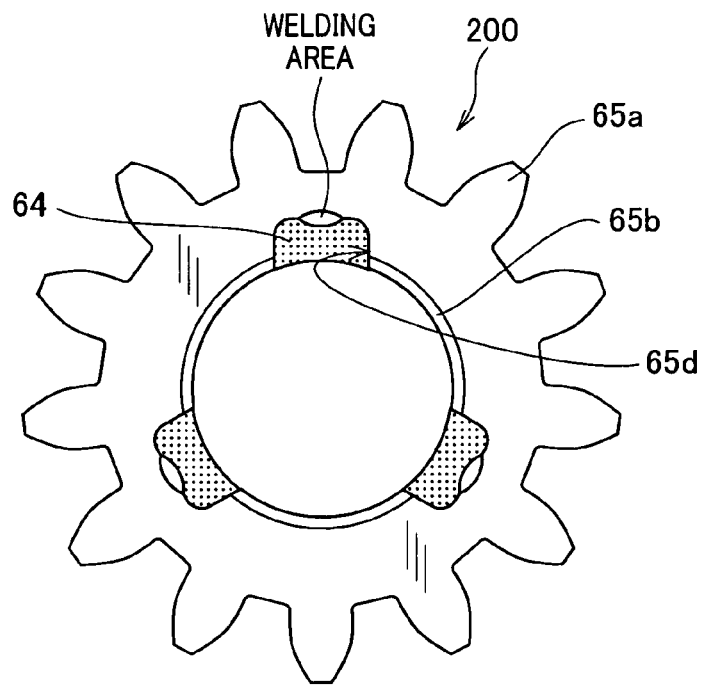
FIG. 15 shows a plane view of a pinion gear that laminated a plurality of steel sheet according to the third embodiment, a third example.

FIG. 15 is a plane view of the pinion gear 200 according to the third embodiment, the third example of the present invention.

The pinion gear 200 of the third example is integrated in such a manner that the steel sheets 65 are laminated and joined in the axial direction by welding etc, which is the same manner as in the first example of the third embodiment. In addition, as shown in FIG. 7, oils and fats 64 such as grease is filled in the concave portions 65d formed in the first sheet 65A.

When the pinion gear 200 rotates, the oils and fats 64 filled in the concave portions 65d moves little by little from the gap between the laminated steels 65 to the outer circumference side by the centrifugal force. Most of the fat and oil which has reached the outer circumference seeps little by little. Since the seeping oil acts as lubricating oil between teeth which engage with the ring gear 41, wear resistance of the pinion gear 200 and the ring gear 41 can be improved. Since each gap between the steels is minute, the fat and oil seeps from the tooth surfaces little by little. This can maintain the wear resistance for a long time. Combing the constitution with that of the third example of the third embodiment can maintain the wear resistance for a further long time. Hence, the pinion gear 200 can be preferably applied to vehicles in which an idle stop system is introduced.

[Modification]

The pinion gear 200 described in the first embodiment is constituted by combing the first sheets 65A with the second sheets 65B in order to arrange the spring 61 (elastic member) on the inner diameter side thereof. That is, the fitting holes 65e formed in the second sheets 65B have inner diameters larger than those of the fitting holes 65c formed in the first sheets 65A. In consequence, the space in which the spring 61 can be arranged is provided in the inner circumferences of the fitting holes 65e. Alternatively, all the steel sheets 65 (ten sheets in the first embodiment) consisting the pinion gear 200 may be the same shape (that is, inner diameters of the fitting holes are the same) without separating the first sheets 65A and the second sheets 65B. In this case, for example, an elastic member such as the spring 61 may be arranged between the inner-diameter-side end surface of the steel 65 which is arranged on the most right-hand side of the pinion gear 200 shown in FIG. 10 and the tube side end surface 59a of the inner tube 59. Alternatively, the pinion gear 200 may be constituted by using no elastic member.

What is claimed is:

1. A starting device for engines comprising:
   a motor that generates torque;
   a pinion gear that moves in an axial direction and engages to a ring gear of an engine, and transmits the torque of the motor to the ring gear;
   a solenoid device having a first coil that forms an electromagnet by energization, and pushes out the pinion gear to the ring gear side via a shift lever that is driven by an attraction power of the first coil; and
   an electromagnetic switch having a second coil that forms an electromagnet by energization, and opens and closes a main point of contact disposed on a motor circuit by an attraction power of the second coil; wherein,
   the solenoid device and the electromagnetic switch are arranged integrally in series in an axial direction, while a magnetic plate that forms a part of a magnetic circuit between the first coil and the second coil is shared by the solenoid device and the electromagnetic switch; and
   a direction of a magnetic flux generated by energization to the first coil that passes along the magnetic plate and a direction of a magnetic flux generated by energization to the second coil that passes along the magnetic plate are opposite directions.

2. The starting device for engines according to claim 1; wherein,
   the first coil and the second coil are wound so that the directions of a current flow in the first coil and in the second coil are the same.

3. The starting device for engines according to claim 2;
   the starting device further comprising:
   a frame part that forms a part of the magnetic circuit in an anti-magnetic plate side of the first coil in an axial direction; and
   a second magnetic plate that forms a part of the magnetic circuit in an anti-magnetic plate side of the second coil in an axial direction; wherein,
   when a thickness of the frame part is T1;
   a thickness of the magnetic plate arranged between the first coil and the second coil is T2; and
   a thickness of the second magnetic plate is T3, the following formula (1) is satisfied $$T2 \leq T1 + T3 \qquad \text{(formula 1)}.$$

4. The starting device for engines according to claim 1, further comprising:
   an electromagnetic switch comprising:
   an electromagnetic coil that forms an electromagnet by energization;

a fixed iron core that is magnetized by an energization to the electromagnetic coil arranged on one end side in an axial direction of the electromagnetic coil; and a movable iron core that moves in the axial direction in an inner circumference of the electromagnetic coil; wherein, a laminated part formed by laminating a plurality of steel sheets in an axial direction is provided to one or both of the movable iron core and the fixed iron core in the part where the movable iron core is attracted by the magnetized fixed iron core and collide each other.

5. The starting device for engines according to claim 4; wherein, a boss part for supporting and fixing the laminated part is provided in either the movable iron core or the fixed iron core that constitutes the laminated part;

each of a plurality of steel sheet is formed in a ring shape with a round hole opened in a central part thereof;

the laminated part in the state where a plurality of steel sheet is laminated, the boss part is inserted into an inner circumference of the round hole, and an inner circumference side of a plurality of steel sheet is fixed to the boss part by press fitting or caulking; and a perimeter side of a plurality of steel sheet is laminated in the state where each steel sheets has dissociated.

6. The starting device for engines according to claim 4; wherein, the laminated part has a resin member having $\frac{1}{10}$ or less thickness of the steel sheet intervene between the steel sheets.

7. The starting device for engines according to claim 4; wherein, the fixed iron core comprises a base part arranged facing the movable iron core and a disc part having a ring shape that supports the base part by fitting to a perimeter of the base part;

the base part is constituted with a plurality of laminated steel sheets.

8. The starting device for engines according to claim 4; wherein, the electromagnetic coil is equipped in a starting device for automobiles.

9. The starting device for engines according to claim 1, further comprising:

a pinion gear constituted by laminating a plurality of steel sheet with which tooth portions of the pinion gear are formed in an outer diameter side; wherein, the steel sheet adjoin in a lamination direction are joined in an axial direction in the position where the steel sheets do not get caught with the tooth portions so that at least each tooth portion can be bent mutually.

10. The starting device for engines according to claim 9, wherein, the pinion gear has a central hole in a central part thereon in a radical direction that penetrates in an axial direction;

a plurality of steel sheet has a hole in the central part thereon in the radical direction that forms the central hole, while a plurality of concave part dented towards an outside in the radial direction from an inner diameter the hole are formed; and a base of a plurality of the concave part is joined in the axial direction.

11. The starting device for engines according to claim 9, wherein, a means for joining is a welding.

12. The starting device for engines according to claim 9, wherein, oil is impregnated in a minute gap formed between each steel sheet that adjoins in the lamination direction.

13. The starting device for engines according to claim 10, wherein, each concave part formed in a plurality of steel sheet is filled up with oils and fats, such as grease.

14. The starting device for engines according to claim 9, wherein, an output shaft has a clutch on its perimeter that fit in helical-spline manner;

the pinion gear is fit in a spline manner to a perimeter of an inner tube that is an inner of the clutch extended in an anti-motor direction and rotates integrally with the inner tube, while the pinion gear is supported movably in predetermined distance against the inner tube;

a pinion gear side end surface and a inner tube side end surface are formed between the pinion gear and the inner tube facing each other in the axial direction, while an elastic body is arranged between the pinion gear side end surface and the inner tube side end surface.

* * * * *